United States Patent [19]

Yagisawa et al.

[11] Patent Number: 5,170,349
[45] Date of Patent: Dec. 8, 1992

[54] TEXT PROCESSING APPARATUS USING MODIFICATION RELATION ANALYSIS

[75] Inventors: Tsuyoshi Yagisawa, Kawasaki; Takaya Ueda, Yokohama, both of Japan

[73] Assignee: Canon Kabushiki Kaisha, Tokyo, Japan

[21] Appl. No.: 493,104

[22] Filed: Mar. 13, 1990

[30] Foreign Application Priority Data

Mar. 14, 1989 [JP] Japan .................................. 1-63257
Mar. 14, 1989 [JP] Japan .................................. 1-63258

[51] Int. Cl.$^5$ ............................................. G06F 15/38
[52] U.S. Cl. .................................................... 364/419
[58] Field of Search .................... 364/419, 200, 900

[56] References Cited

U.S. PATENT DOCUMENTS 4,805,132  2/1989  Okamoto et al. ..................... 364/419
4,814,987  3/1989  Miyau et al. ......................... 364/419

OTHER PUBLICATIONS

"Diagramming Complex Sentences with Modifiers", Larry Pogue, Elec. Learning, vol. 5, No. 5, p. 61, Abstract from Microsearch file of Orbit, AN:85–030–412, 1985.

"Educational Software", David Lubar, Creative Computing Software Buyer's Guide, 1982, Abstract from Microsearch File of Orbit AN:82–00176.

Primary Examiner—Gail O. Hayes
Attorney, Agent, or Firm—Fitzpatrick, Cella, Harper & Scinto

[57] ABSTRACT

In a text processing apparatus, a diagram of the mutual relationships between words or phrases of an inputted sentence is formed and the modification relationships of the sentence structure are displayed. The modification relationship sentence-structure diagram reflects the order of each word or phrase in the sentence and the perspective of the distance between words or phrases in modification relationship to each other in the sentence. Corrections are made to the inputted sentence by correcting the diagram structure.

10 Claims, 35 Drawing Sheets

FIG. 3

| 私の | 妹は | とても | 高い | 本と | 週刊誌を | きのう | 買った。 |
|---|---|---|---|---|---|---|---|
| 1 | 2 | 3 | 4 | 5 | 6 | 7 | 8 |

FIG. 4

| BUNSETSU NUMBER i | BUNSETSU Bi | LENGTH OF BUNSETSU $l_i$ (NUMBER OF CHARACTERS) | BUNSETSU TO BE MODIFIED $Q_i$ (NUMBER) | MODIFICATION RELATION $T_i$ | OTHER INFORMATION |
|---|---|---|---|---|---|
| 1 | 私の | 2 | 2 | RENTAI | --- |
| 2 | 妹は | 2 | 8 | RENYOU | --- |
| 3 | とても | 3 | 4 | RENYOU | --- |
| 4 | 高い | 2 | 5 | RENTAI | --- |
| 5 | 本と | 2 | 6 | PARALLEL RELATION | --- |
| 6 | 週刊誌を | 4 | 8 | RENYOU | --- |
| 7 | きのう | 3 | 8 | RENYOU | --- |
| 8 | 買った | 3 | 0 | END OF SENTENCE | --- |

FIG. 5

| MODIFICATION RELATION | REPRESENTATION ON SENTENCE-STRUCTURE DIAGRAM |
|---|---|
| RENYOU MODIFICATION | ——— (STRAIGHT LINE) |
| RENTAI MODIFICATION | ⟶ (ARROW) |
| PARALLEL RELATION BETWEEN NOUN PHRASES | = (TWO VERTICAL LINES) |

| BUNSETSU i (NUMBER) | NUMBER OF BUNSETSUS MODIFYING BUNSETSU i Mi | BUNSETSU Cij MODIFYING BUNSETSU i (NUMBER) | | |
|---|---|---|---|---|
| 1 | 0 | | | |
| 2 | 1 | 1 | | |
| 3 | 0 | | | |
| 4 | 1 | 3 | | |
| 5 | 1 | 4 | | |
| 6 | 1 | 5 | | |
| 7 | 0 | | | |
| 8 | 3 | 2 | 6 | 7 |

○ : NODE (BUNSETSU)

FIG. 11 (a)

| y \ x | 1 | 2 | 3 | 4 | 5 |
|---|---|---|---|---|---|
| 1 | 1 | 2 |   |   |   |
| 2 | 3 | 4 | 5 | 6 |   |
| 3 | 7 |   |   |   | 8 |

FIG. 11 (b)

| y \ x | 1 | 2 | 3 | 4 | 5 |
|---|---|---|---|---|---|
| 1 | 1 | 2 |   |   |   |
| 2 | 3 | 4 | 5 | 6 |   |
| 3 |   |   |   | 7 | 8 |

FIG. 11 (c)

| y \ x | 1 | 2 | 3 | 4 |
|---|---|---|---|---|
| 1 | 1 | 2 |   |   |
| 2 | 3 | 4 | 5 |   |
| 3 |   |   | 6 |   |
| 4 |   |   | 7 | 8 |

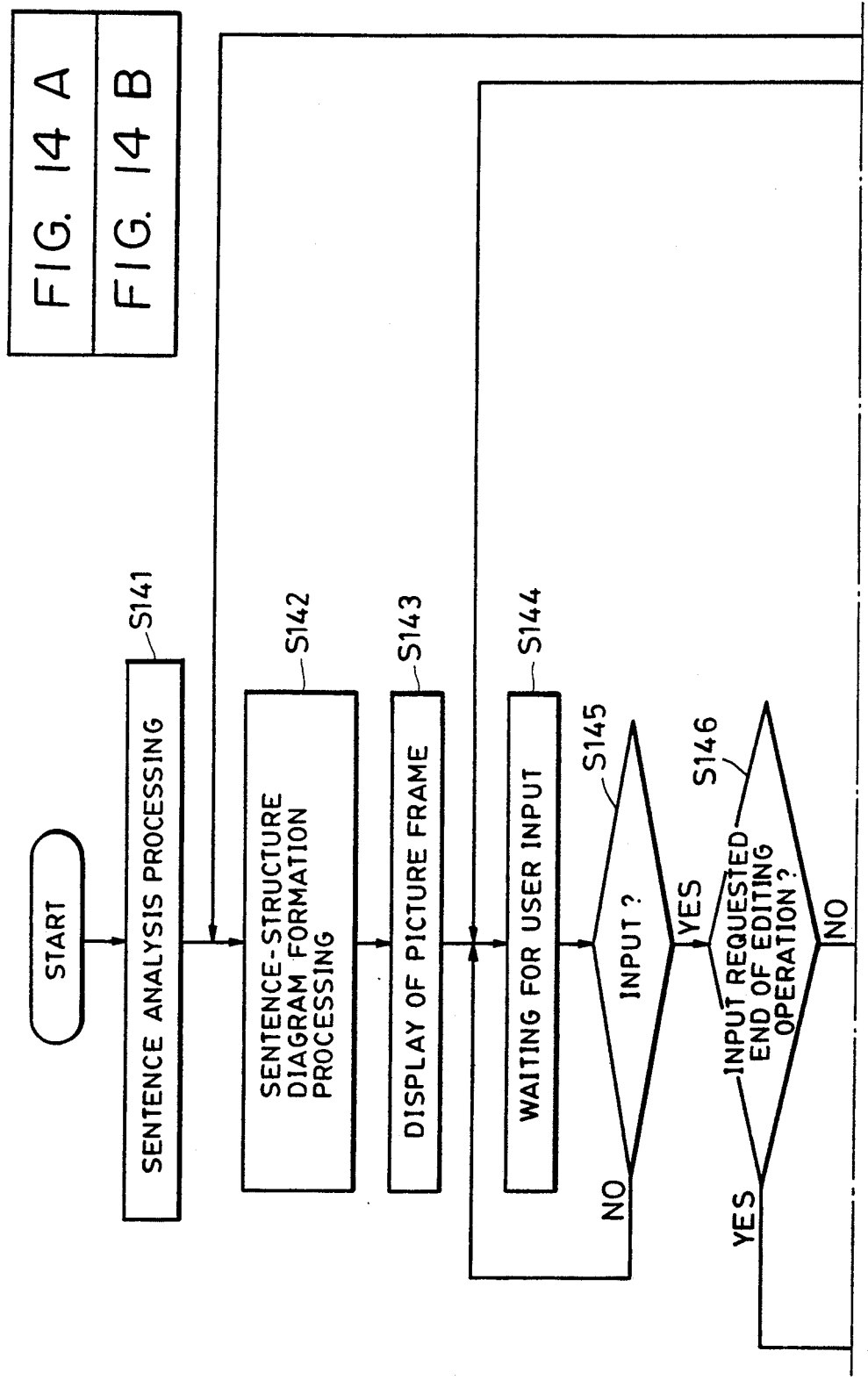

FIG. 15

RULES FOR THE ADDITION OF PUNCTUATION POINTS

- WHEN THERE ARE A PLURALITY OF LONG MODIFICATION WORDS, A PUNCTUATION POINT IS PROVIDED AT THE BOUNDARY.
- WHEN A FUNDAMENTAL WORD ORDER IS REVERSED, A PUNCTUATION POINT IS PROVIDED.

FIG. 16

RULES FOR THE CHANGE OF WORD ORDER

- A WORD TO BE MODIFIED IS PLACED IMMEDIATELY AFTER A MODIFICATION WORD.
- PHRASES ARE PLACED AHEAD, AND WORDS ARE PLACED BEHIND.
- LONG MODIFICATION WORDS ARE PLACED AHEAD, AND SHORT MODIFICATION WORDS ARE PLACED BEHIND.

| BUNSETSU NUMBER | BUNSETSU | NUMBER OF BUNSETSU TO BE MODIFIED | MODIFICATION RELATION | OTHER INFORMATION |
|---|---|---|---|---|
| 1 | 麻知子は | 5 | RENYOU | --- |
| 2 | 泣きながら | 5 | RENYOU | --- |
| 3 | 走りまる | 4 | RENTAI | --- |
| 4 | 耕平を | 5 | RENYOU | --- |
| 5 | 追いかけた | -1 | END OF SENTENCE | --- |

| BUNSETSU NUMBER | BUNSETSU | NUMBER OF BUNSETSU TO BE MODIFIED | MODIFICATION RELATION | OTHER INFORMATION |
|---|---|---|---|---|
| 1 | 麻知子は | 5 | RENYOU | |
| 2 | 泣きながら | 3 | RENYOU | |
| 3 | 走りまる | 4 | RENTAI | |
| 4 | 耕平を | 5 | RENYOU | |
| 5 | 追いかけた | -1 | END OF SENTENCE | |

麻知子は、泣きながら走り去る耕平を追いかけた。

泣きながら 走り去る 耕平を 麻知子は 追いかけた。

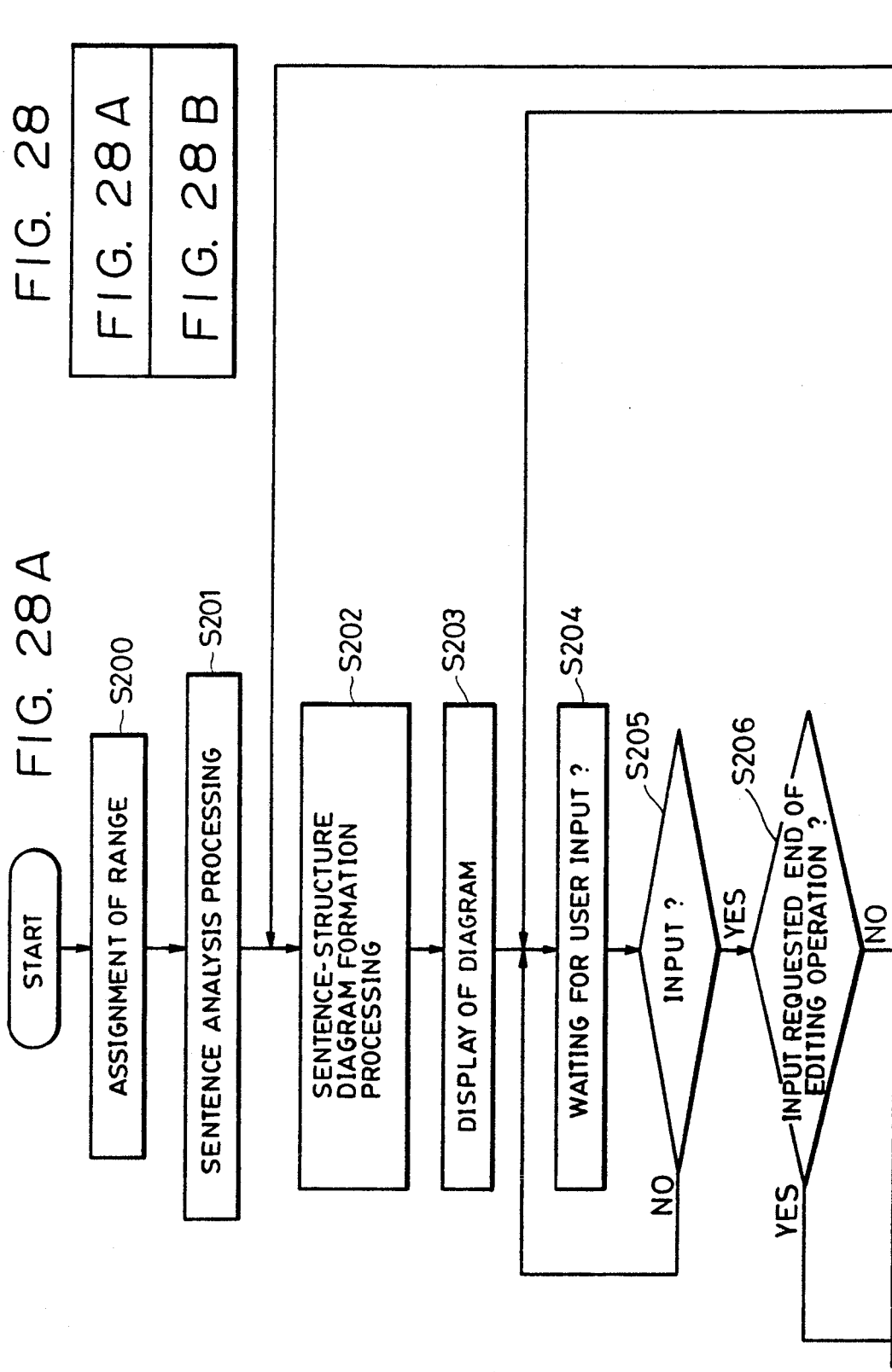

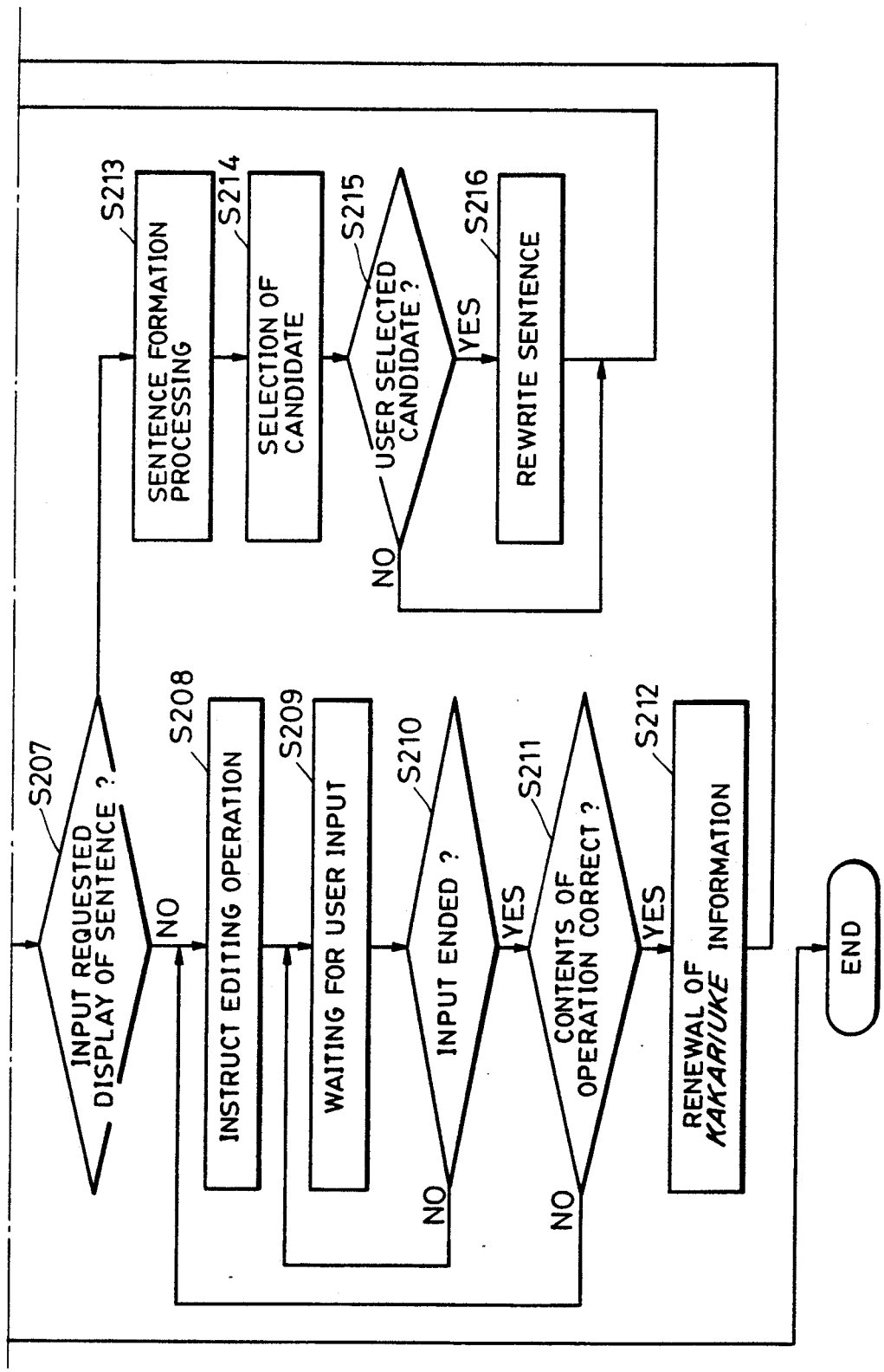

FIG. 29

| Ⓢ . | Yesterday | I | saw | a girl | with | a telescope . |
|---|---|---|---|---|---|---|
| 1 | 2 | 3 | 4 | 5 | 6 | 7 |

FIG. 30(a)

| WORD/PHRASE NUMBER i | WORD/PHRASE Pi | LENGTH OF WORD/PHRASE $\ell_i$ (NUMBER OF CHARACTERS) | WORD/PHRASE TO BE MODIFIED $Q_i$ (NUMBER) | MODIFICATION RELATION $T_i$ | OTHER INFORMATION |
|---|---|---|---|---|---|
| 1 | Ⓢ | 1 | 0 | HEAD OF SENTENCE | --- |
| 2 | Yesterday | 9 | 1 | RENYOU | --- |
| 3 | I | 1 | 3 | RENYOU | --- |
| 4 | saw | 3 | 3 | RENYOU | --- |
| 5 | a girl | 6 | 4 | RENYOU | --- |
| 6 | with | 4 | 4 | RENYOU | --- |
| 7 | a telescope | 11 | 6 | RENYOU | --- |

FIG. 30 (b)

| WORD/PHRASE NUMBER i | WORD/PHRASE Pi | LENGTH OF WORD/PHRASE $\ell_i$ (NUMBER OF CHARACTERS) | WORD/PHRASE TO BE MODIFIED Qi (NUMBER) | MODIFICATION RELATION $T_i$ | OTHER INFORMATION |
|---|---|---|---|---|---|
| 1 | a telescope | 11 | 2 | RENYOU | --- |
| 2 | with | 4 | 4 | RENYOU | --- |
| 3 | a girl | 6 | 4 | RENYOU | --- |
| 4 | saw | 3 | 5 | RENYOU | --- |
| 5 | I | 1 | 7 | RENYOU | --- |
| 6 | Yesterday | 3 | 7 | RENYOU | --- |
| 7 | Ⓢ | 1 | 0 | END OF SENTENCE | --- |

FIG. 31

| MODIFICATION RELATION | REPRESENTATION ON SENTENCE-STRUCTURE DIAGRAM |
|---|---|
| *RENYOU* MODIFICATION | ——— (STRAIGHT LINE) |
| *RENTAI* MODIFICATION | ⟶ (ARROW) |
| PARALLEL RELATION OF NOUN PHRASES | ∥ (TWO VERTICAL LINES) |

FIG. 33 (a)

| y \ x | 1 | 2 | 3 | 4 | 5 |
|---|---|---|---|---|---|
| 1 | 1 | 2 |   |   |   |
| 2 |   | 3 | 4 | 5 |   |
| 3 |   |   |   | 6 | 7 |

FIG. 33 (b)

| y \ x | 1 | 2 | 3 | 4 | 5 |
|---|---|---|---|---|---|
| 1 | 1 | 2 |   |   |   |
| 2 |   | 3 | 4 | 5 |   |
| 3 |   |   |   | 6 | 7 |

FIG. 35(a)

| WORD/PHRASE NUMBER i | WORD/PHRASE $P_i$ | LENGTH OF WORD/PHRASE $\ell_i$ (NUMBER OF CHARACTERS) | WORD/PHRASE TO BE MODIFIED $Q_i$ (NUMBER) | MODIFICATION RELATION $T_i$ | OTHER INFORMATION |
|---|---|---|---|---|---|
| 1 | Ⓢ | 1 | 0 | HEAD OF SENTENCE | --- |
| 2 | Yesterday | 9 | 1 | RENYOU | --- |
| 3 | I | 1 | 3 | RENYOU | --- |
| 4 | saw | 3 | 4 | RENYOU | --- |
| 5 | a girl | 6 | 5 | RENTAI | --- |
| 6 | with | 4 | 6 | RENYOU | --- |
| 7 | a telescope | 11 | | | --- |

FIG. 35 (b)

| WORD/PHRASE NUMBER i | WORD/PHRASE Pi | WORD/PHRASE LENGTH ℓi (NUMBER OF CHARACTERS) | WORD/PHRASE TO BE MODIFIED Qi (NUMBER) | MODIFICATION RELATION Ti | OTHER INFORMATION |
|---|---|---|---|---|---|
| 1 | a telescope | 11 | 2 | RENYOU | --- |
| 2 | with | 4 | 3 | RENTAI | --- |
| 3 | a girl | 6 | 4 | RENYOU | --- |
| 4 | saw | 3 | 5 | RENYOU | --- |
| 5 | I | 1 | 7 | RENYOU | --- |
| 6 | Yesterday | 3 | 7 | RENYOU | --- |
| 7 | (S) | 1 | 0 | END OF SENTENCE | --- |

FIG. 36 (a)

| y \ x | 1 | 2 | 3 | 4 | 5 | 6 |
|---|---|---|---|---|---|---|
| 1 | 1 | 2 | 3 | 4 | 5 |   |
| 2 |   |   |   |   | 6 | 7 |

FIG. 36 (b)

| y \ x | 1 | 2 | 3 | 4 | 5 | 6 |
|---|---|---|---|---|---|---|
| 1 | 1 | 2 |   |   |   |   |
| 2 |   | 3 | 4 | 5 | 6 | 7 |

TEXT PROCESSING APPARATUS USING MODIFICATION RELATION ANALYSIS

BACKGROUND OF THE INVENTION

1. Field of the Invention

This invention relates to a text processing apparatus which represents the mutual relation, such as modification, under modification and the like, between words or phrases constituting a sentence in a diagram, and provides the structure of the sentence in a form capable of easily visually grasping the structure.

2. Description of the Related Art

Heretofore, as methods for representing the structure of a sentence by computer processing according to so-called kakariuke relation in Japanese grammar, such as the relation of modification and under modification, for example, between an adjective and an noun or between an adverb and a verb, and the relation between a subject and a predicate in the sentence, there exist, for example, a representation by a sentence-structure analysis tree as shown in FIG. 9, an S-type representation in LISP (list processing language), a representation by a semantic network, and the like.

However, all the above-described methods or representation and display have been made from the viewpoint of developers and researchers of sentence analysis programs, and hence it is not easy for general users who form a text to immediately grasp the meanings in each method.

Furthermore, in the above-described display methods of sentence structures, for example, relative to the kakariuke relation, the primary object is for expressing the relative relation thereof. Hence, the perspective of the distance between bunsetsus (a bunsetsu is a constitutional unit in a Japanese sentence which correspond to a word or a phrase) in the kakariuke relation with each other in a sentence, and the order of bunsetsus are not clearly reflected.

When the author of a text polishes the formed text, he reads the text paying attention if there are misspellings in the text, or if there are portions having vague meanings, portions difficult to understand, and the like.

In such a case, however, if the auther only reads a normal text, that is, one-dimensional word trains, he hardly notices the existence of vague portions capable of causing various interpretations. Particularly in the case of Japanese, since restriction in the word order in a sentence is relatively small, there often occur cases having problems in that a plurality of interpretations of the meaning of the sentence exist, or the meaning of the sentence is hard to understand, though grammatically correct, according to the word order of the formed sentence.

However, the author of the sentence often cannot recall other interpretations than the contents he intended to express, and hence cannot notice inconvenience which other readers may feel, by merely reading again the formed sentence.

Furthermore, when an output sentence of a machine translation system has problems as described above, the existence of the problems is often not noticed due to insufficiency in the language ability of the user of the apparatus.

For example, when the sentence "公園で遊んでいる花子の妹はかわいい" is written in Japanese, the following two interpretations hold: that is, "A sister of Hanako who is playing in the park, is pretty"; and "Hanako's sister, who is playing in the park, is pretty". However, the author of the sentence often recalls the only one interpretation he intends to, for example, the interpretation based on the situation that "Hanako is playing in the park", and cannot notice the possibility that readers may interpret that "Hanako's sister is playing in the park", even after reading again the sentence.

Moreover, there is often a sentence the meaning of which is hard to understand, though various interpretations are not produced, because of complicated kakariuke relation. Also in such a case, the author seldom notices the fact by only looking at the sentence.

SUMMARY OF THE INVENTION

It is an object of the present invention to provide a text processing apparatus which represents the mutal relation, such a modification, under modification and the like, between words or phrases constituting a sentence in a diagram,and provides the structure of the sentence in a form capable of easily visually grasping the structure.

It is another object of the present invention to provide a text processing apparatus capable of representing the structure of a sentence in a diagram which clearly reflects the perspective of the distance between words or phrases in modification relation with each other in the sentence, the order of words or phrases, and the like.

It is still another object of the present invention to provide a text processing apparatus capable of correcting an original sentence by correcting a diagram representing the structure of the sentence.

These and other objects are accomplished, according to one aspect of the present invention, by a text processing apparatus comprising sentence holding means for holding a sentence, dictionary means for storing information for analyzing the sentence, sentence analysis means for analyzing the sentence held in the sentence holding means using the information stored in the directory means and for determining modification relation among words or phrases constituting the sentence, modification information holding means for holding information about the modification relation obtained from the result of the determination by the sentence analysis means, sentence-structure diagram formation means for forming a diagram showing the structure of the sentence held in the sentence holding means according to the modification relation held in the modification information holding means, and display means for displaying the sentence-structure diagram formed by the sentence-structure diagram formation means.

According to another aspect, the present invention relates to a text processing apparatus comprising sentence holding means for holding a sentence, dictionary means for storing information for analyzing the sentence, sentence analysis means for analyzing the sentence held in the sentence holding means using the information stored in the dictionary means and for determining modification relation between words or phrases constituting the sentence, modification information holding means for holding information about the modification relation obtained from the result of the determination by the sentence analysis means, sentence-structure diagram formation means for forming a diagram showing the structure of the sentence held in the sentence holding means according to the modification relation held in the modification information holding means, display means for displaying the sentence-structure diagram formed by the sentence-structure diagram formation means, sentence-structure diagram correction means for correcting the sentence-structure diagram displayed on the display means, and sentence formation means for forming a sentence in accordance with the sentence-structure diagram corrected by the sentence-structure diagram correction means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a diagram showing an example of the sentence to be processed in the embodiment;

FIG. 4 is a diagram showing an example of kakariuke information;

FIG. 5 is a diagram showing representations of the modification relation between bunsetsus on the sentence-structure diagram;

FIG. 11(a)-11(c) are diagrams showing arrangement coordinates for respective bunsetsus;

FIGS. 14A and 14B are flowcharts representing the procedure of the sentence-structure diagram correction processing in the embodiment;

FIG. 15 is a diagram showing rules for the addition of punctuation points;

FIG. 16 is a diagram showing rules for the change of word order;

FIG. 17 is a diagram showing an example of the sentence to be processed;

FIGS 18 and 21 are diagrams showing an example of kakariuke information;

FIGS. 19, 20, 22, 24 and 25 are diagrams showing examples of the sentence-structure diagram;

FIGS. 23 and 26 are diagrams showing examples of corrected sentences;

FIGS. 28A and 28B are flowcharts representing the procedure of the sentence-structure diagram correction processing in another embodiment;

FIG. 29 is diagram representing bunsetsu numbers in an example of the sentence;

FIGS. 30(a) and 30(b), and 35(a) and 35(b) are diagrams showing examples of the kakariuke information;

FIG. 31 is a diagram showing representations of modification relation between bunsetsus on the sentence-structure diagram;

FIGS. 33(a) and 33(b), and 36(a) and 36(b) are diagrams showing examples of arrangement coordinates.

DESCRIPTION OF THE PREFERRED EMBODIMENTS

Figure 1:
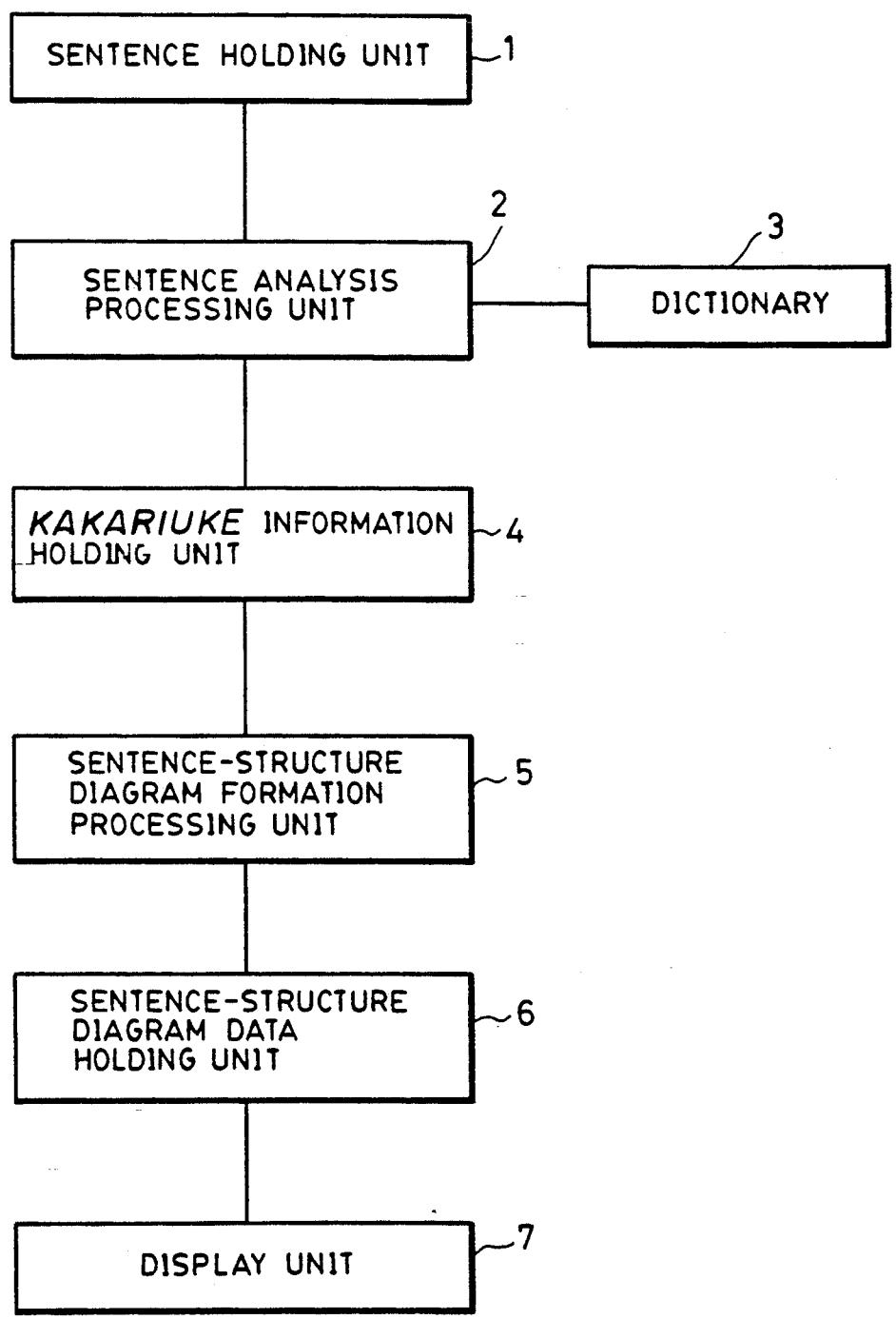
FIG. 1 is block diagram of a text processing apparatus for forming a sentence-structure diagram according to an embodiment of the present invention.

An embodiment of the present invention will now be explained with reference to the drawings. FIG. 1 is a block diagram of a text processing apparatus according to an embodiment of the present invention. In FIG. 1, a sentence holding unit 1 holds a sentence. A sentence analysis processing unit 2 analyzes the sentence held in the sentence holding unit 1, and investigates kakariuke relation between bunsetsus. A dictionary 3 stores the meanings of words, grammar and the like used in the sentence analysis processing unit 2. A kakariuke information holding unit 4 holds information about kakariuke relation between bunsetsus analyzed by the sentence analysis processing unit 2. A sentence-structure diagram formation unit 5 forms a diagram showing the structure of a sentence based on the kakariuke relation from the kakariuke information held in the kakariuke information holding unit 4. A sentence-structure diagram data holding unit 6 holds sentence-structure diagram data formed by the sentence-structure diagram formation processing unit 5. A display unit 7 displays the sentence-structure diagram according to the sentence-structure diagram data held in the sentence-structure diagram data holding unit 6.

The sentence-structure diagram formation processing unit 5 forms a sentence-structure diagram according to the following method.

An explanation will be hereinafter provided using terms relative to the tree structure used in the literature "The Design and Analysis of Computer Algorithms" by A. V. Aho, J. E. Hopcroft and J. D. Ulman (termed hereinafter "literature 1") . In a tree representation which grasps a bunsetsu as a node (corresponding to a "vertex" in literature 1), and a kakariuke relation as a link (corresponding to an "edge" in literature 1), and in a tree structure in which the order of nodes by a post-order traversal scanning of a tree corresponds to the word order of a sentence, that is, in a tree structure in which the last bunsetsu in the tree becomes a root, the basic principle is to arrange a left subtree and a right subtree from the left end and from the right and, respectively, laying the tree on its side (turning the tree to the right by 90°) and making the longest path in each subtree of the tree the border (when a plurality of paths which become longest exist, a path which includes the last bunsetsu in the order in the sentence among the plurality of paths is made the longest path).

Figure 2:
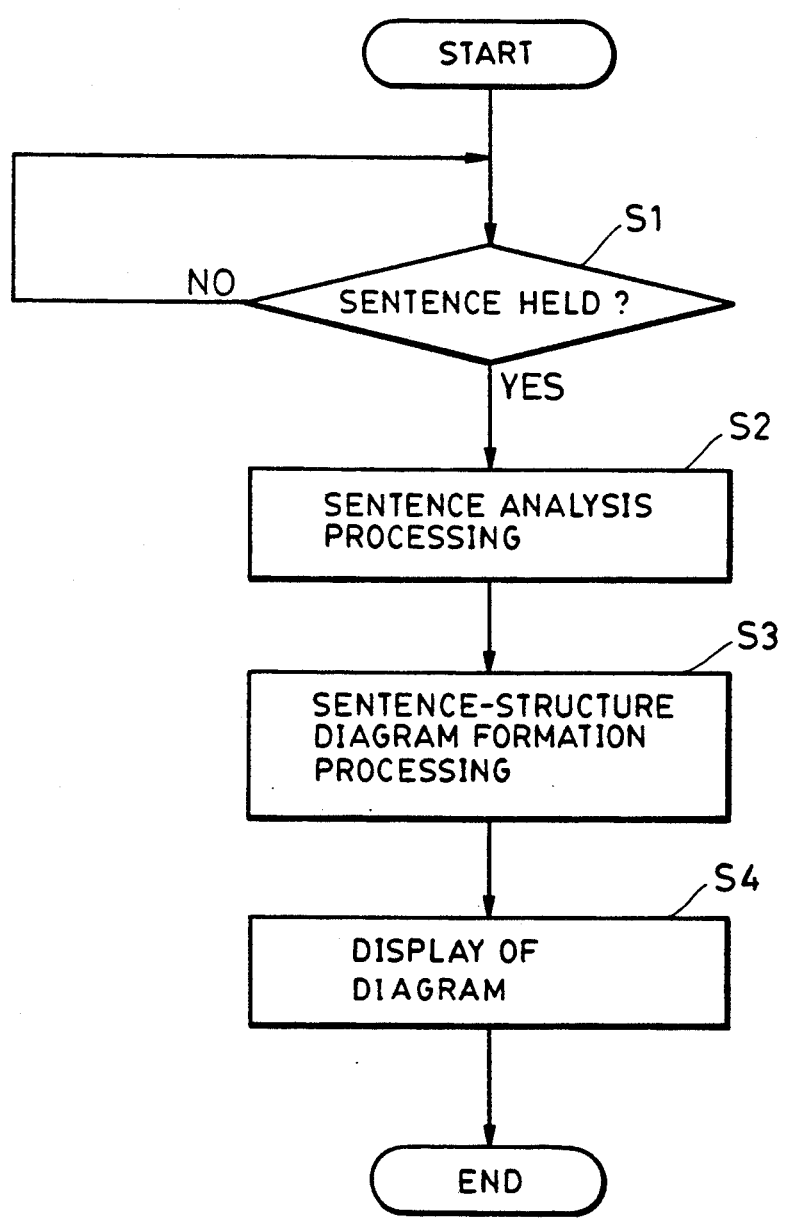
FIG. 2 is a flowchart of the formation processing of the sentence-structure diagram.

FIG. 2 is a flowchart showing the procedure of the sentence-structure diagram formation processing in the apparatus shown in FIG. 1. The procedure of the sentence-structure diagram formation processing in the present embodiment will be explained with reference to the flowchart.

First, at step S1, it is confirmed whether or not a sentence is held in the sentence holding unit 1. Step 1 is repeated until a sentence is held in the sentence holding unit 1. FIG. 3 is a diagram showing an example of the sentence held in the sentence holding unit 1. The operation of the present embodiment will be hereinafter explained using this example of the sentence.

Next, at step S2, the sentence held in the sentence holding unit 1 is analyzed, and the result is held in the kakariuke information holding unit 4. At this step, in the case of a sentence in a language in which boundary between words is not clear, such as Japanese, the sentence held in the sentence holding unit 1 is first divided into words constituting the sentence by referring to the dictionary 3, and the words are then grouped into bunsetsus. Analysis is then performed which bunsetsu each bunsetsu modifies, whether the modification relation is renyou modification (which modifies a word or a phrase corresponding to a verb or an adjective—adverb-like modification), rentai modification (which modifies a word corresponding to a noun—adjective-like modification), or the like, and the result is held in the kakariuke information holding unit 4.

In the example of the sentence shown in FIG. 3, it is vague whether the phrase "とても 高い" (very expensive) modifies only "book", or the entire "book and weekly magazine" in the phrase "本と 週刊誌" (book and weekly magazine: in Japanese, there exist no articles, and an identical word is used both for a single number and a plural number). In the present embodiment, the operation of the processing which analyzes the sentence as the latter case described above and forms the corresponding sentence-structure diagram.

FIG. 4 is a diagram showing an example of the result of sentence analysis to be held in the kakariuke information holding unit 4 as a result of the step 2 processing for the example of the sentence shown in FIG. 3.

Next, at step S3, a diagram showing the structure of the sentence is formed according to the kakariuke information held in the kakariuke information holding unit 4.

Figure 7:
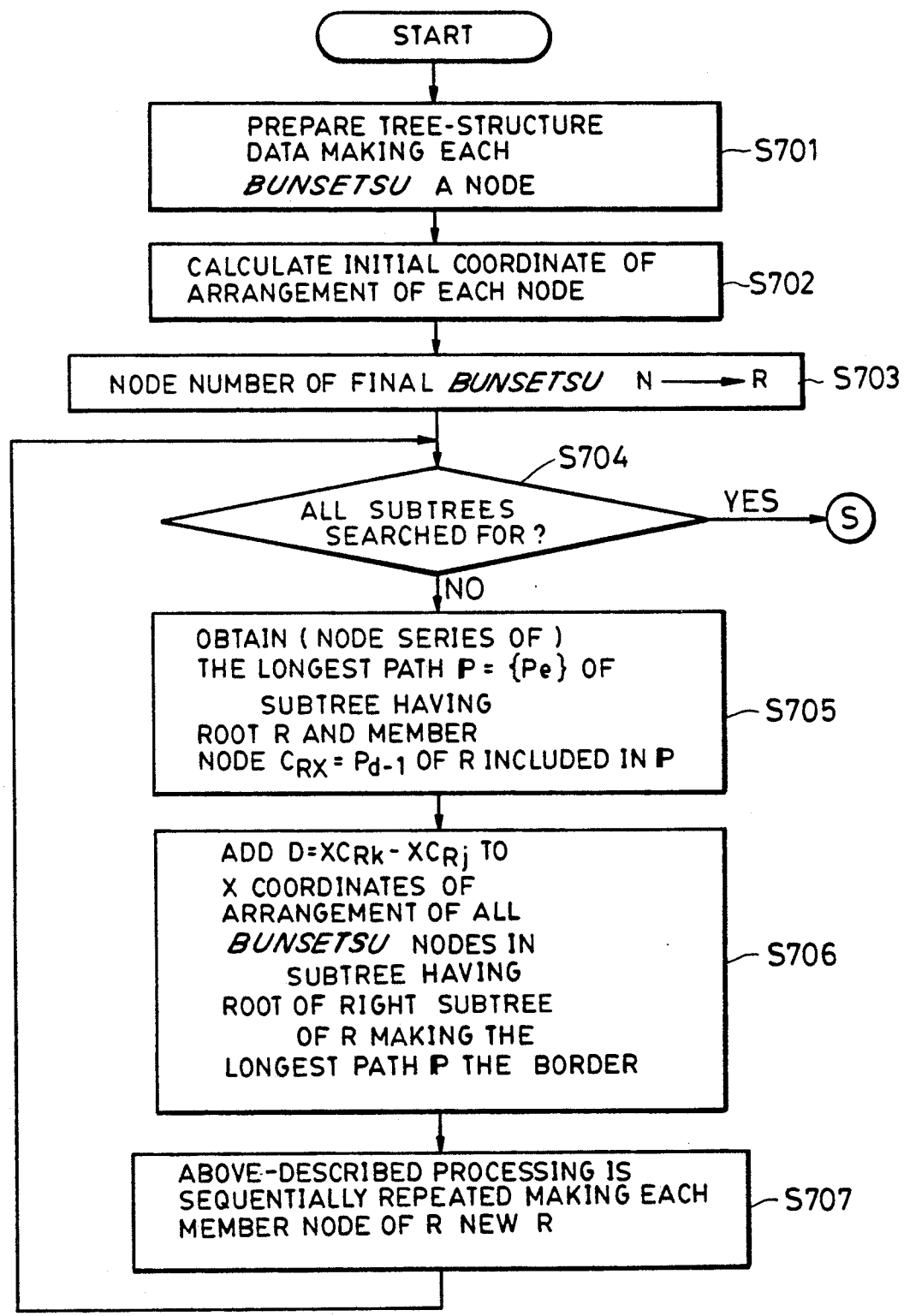
FIG. 7, composed of FIGS. 7(a) and 7(b), is a flowchart of the processes for forming the sentence-structure diagram.
Figure 7:
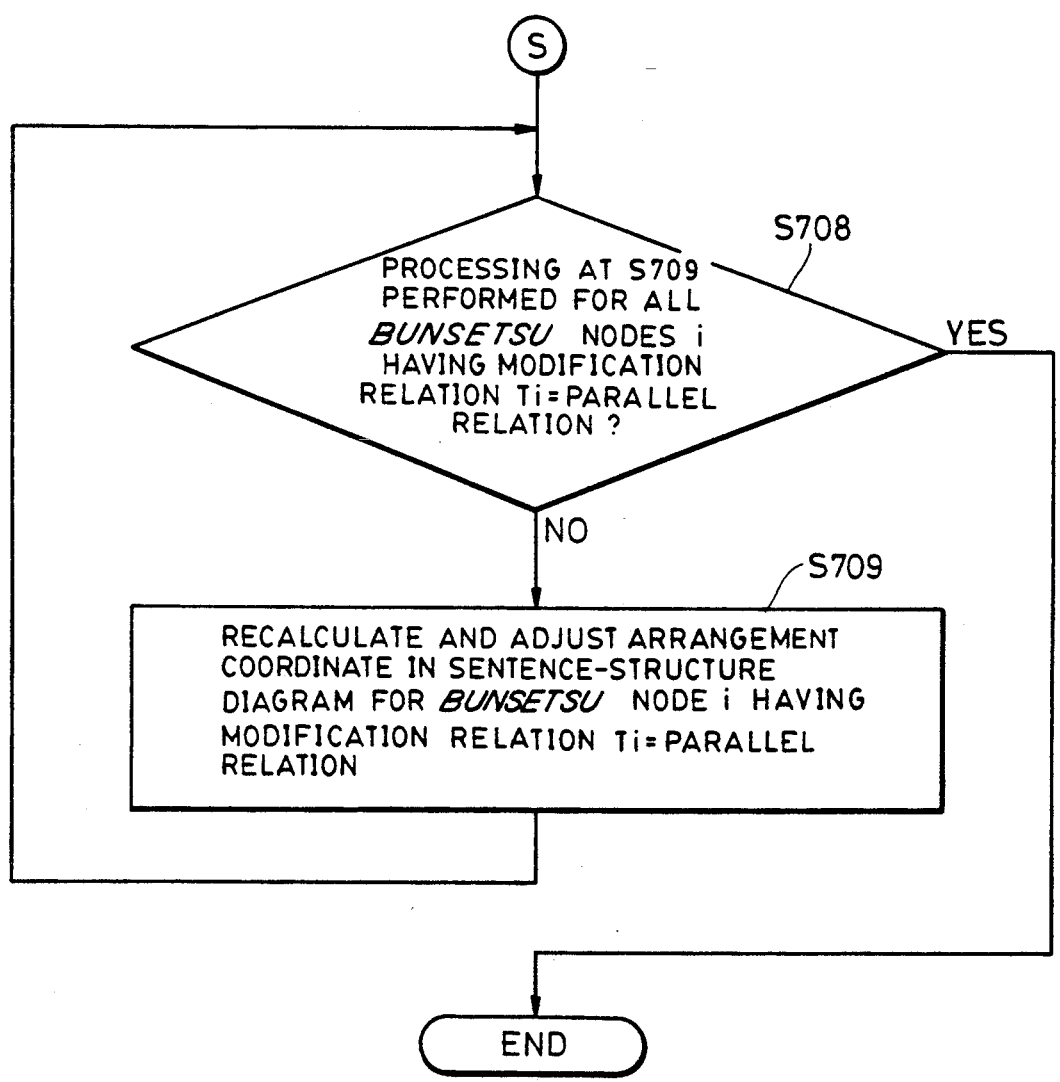

FIG. 7, composed of FIGS. 7(a) and 7(b), is a flowchart showing a procedure of the sentence-structure formation processing at step S3 shown in FIG. 2. Concrete operation processes of the sentence-structure diagram formation processing will now be explained with reference to FIG. 7.

Figures 8, 9:
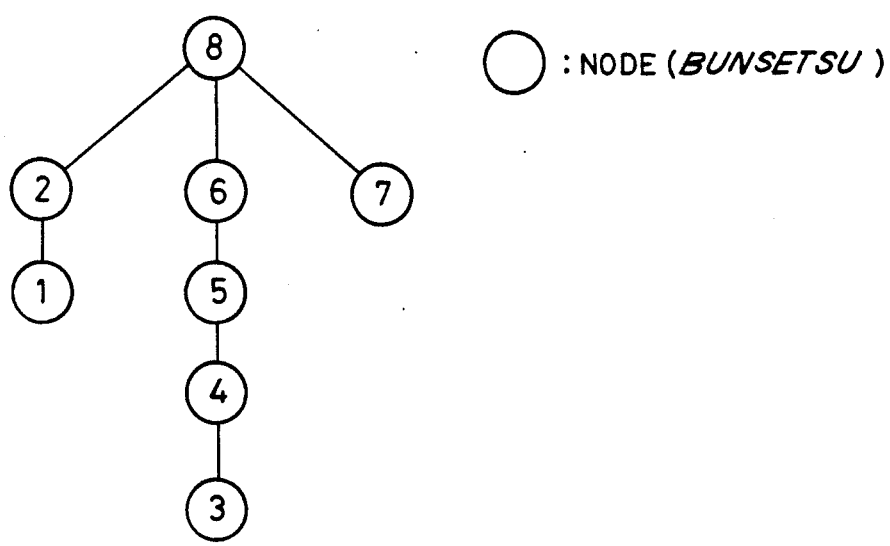
FIG. 8 is a diagram showing an example of tree-structure data.
FIG. 9 is a schematic diagram of a tree structure.

First, at step S701, kakariuke's tree structure data making each bunsetsu i (i = 1, 2, - - - , N; N is the bunsetsu number) nodes are formed according to the kakariuke information held in the kakariuke information holding unit 4. FIG. 8 is a diagram showing an example of the kakariuke's tree structure data formed at step S701. FIG. 9 shows a tree structure obtained from data shown in FIG. 8.

Next, at step S702, the initial coordinate $(x_i, y_i)$ of the arrangement of each bunsetsu in the sentence-structure diagram is determined.

$x_i$ and $y_i$ are calculated according to the following recurrence fomulas (a).

Recurrence formulas (a):

$$x_i = \begin{cases} \max_{1 \leq j \leq M_i} [x_{cij}] + 1 & (M_i > 0) \\ 1 & (M_i = 0) \end{cases}$$

$$y_i = \begin{cases} y_{i-1} & (Q_{i-1} = i, i > 1) \\ y_{i-1} + 1 & (Q_{i-1} \neq i, i > 1) \\ 1 & (i = 1). \end{cases}$$

In the above-described formulas, $M_i$ represents the number of member nodes of node i, that is, the number of bunsetsus modifying bunsetsu i, $C_{ij}$ represents the number of j-th node counted from the head among member nodes of node i, and $Q_i$ is the number of the node of a bunsetsu modified by the bunsetsu of node i. Accordingly, $M_i = 0$ indicates that there are no member nodes, and $Q_{i-1} = i$ indicates that bunsetsu i−1 modifies bunsetsu i which is immediately after it. FIG. 11(a) is a diagram showing the initial coordinates for the arrangement of respective bunsetsus calculated according to the recurrence formulas (a).

Next, at steps S703–707, in order to make the sentence-structure diagram easier to observe and understand, the following processing is performed in which all nodes in the right subtree having the root of each node are arranged from the right end.

First, at step S703, the node number (8 in the present embodiment) of the last bunsetsu is set to node R which will be the root, and the processing after step S704 is performed for the tree shown in FIG. 9 which makes node R = 8 the root.

At step S704, it is confirmed whether or not the processing after step S705 has been performed for all the subtrees. If the processing has been performed, the process proceeds to step S708. If the processing has not been performed, the processing after step S705 is performed for unprocessed subtrees.

At step S705, the longest path is obtained from among paths in the tree (subtree) having the root of node R. In the present case, from among the following paths in the tree having the root of R = 8, $P_1 = \{1, 2, 8\}$
$P_2 = \{3, 4, 5, 6, 8\}$
$P_3 = \{7, 8\}$, the longest path $P = P_2 = \{3, 4, 5, 6, 8\}$ is obtained. In this case, it can be understood that, among member nodes $\{C_{81} = 2, C_{82} 6, C_{83} = 7\}$ of the bunsetsu node R = 8, the member node included in the longest path is $C_{82} = 6$.

Next, at step S706, the values of x coordinates are adjusted in order to arrange all nodes (only $C_{83}$ in this case) in the right subtree of bunsetsu node R = 8, that is, the subtree having the root of bunsetsu node $C_{83}$, from the right end in the sentence-structure diagram, making the longest path $\{3, 4, 5, 6, 8\}$ obtained at step S705 the border. That is, by adding the adjusting value D, in this case, $D = x_{C82} - x_{C83} = x_6 - x_7 = 4 - 1 = 3$ to $x_7 = 1$, we obtain $x_7 - 1 + 3 = 4$.

Next, at step S707, the processing at steps S705-707 is sequentially repeated for the subtree having the root of each of member nodes $\{C_{81} = 2, C_{82} = 6, C_{83} = 7\}$ of R = 8. In the present case, since there is only one member node (that is, there is no right subtree) for all remaining subtrees, the adjustment of the arrangement coordinate of each bunsetsu node in the sentence-structure diagram is not need at steps S705-707. The arrangment coordinates obtained from the foregoing processing are shown in FIG. 11(b). The process then proceeds to step S708.

At steps S708-709, in order to arrange bunsetsus having parallel relation one above another so that parallel relation is easily grasped, the following adjustment is performed.

At step S708, it is determined whether or not the processing at step S709 has been performed for all the bunsetsus i having "modification relation $T_i$=parallel". If there are unprocessed bunsetsus, the process proceeds to step S709. When the processing has been performed for all the bunsetsus i having "modification relation $T_i$=parallel" or when there is no bunsetsu i having "modification relation $T_i$=parallel", the processing is terminated.

In the example of the sentence shown in FIG. 3, since "modification relation $T_i$=parallel" when $i=5$ ("※と"), as shown in FIG. 4, the following processing at step S709 is performed for this bunsetsu.

At step S709, arrangement coordinates in the sentence-structure diagram are recalculated for necessary portions according to the following adjustment rules (b).

Adjustment rules (b):

For every bunsetsu i having the modification relation $T_i$=parallel, when $Q_i=i+1$ (when bunsetsu i modifies the immediately next bunsetsu i+1), $$x_j = \begin{cases} x_j - 1 \text{ for } i+1 \leq j \leq N \\ \text{(when bunsetsu } i \text{ is included in the} \\ \text{longest path of the tree)} \\ x_j - 1 \text{ for } i+1 \leq j \leq m \\ y_{i+1} = ---- = y_m \\ \text{(when bunsetsu } i \text{ is included in the left} \\ \text{subtree of the tree)} \\ x_j + 1 \text{ for all nodes } j \text{ of the subtree} \\ \text{having the root of bunsetsu } i) \\ \text{(when bunsetsu } i \text{ is included in the right} \\ \text{subtree of the tree)} \end{cases}$$

$$y_j = y_j + 1 \text{ for } i+1 \leq j \leq N.$$

When $Q_i \neq i+1$ (when bunsetsu i does not modify the immediately next bunsetsu i+1), $$x_j = \begin{cases} x_j - 1 \text{ for } i+1 \leq j \leq N \\ \text{(when bunsetsu } i \text{ is included in the} \\ \text{longest path of the tree)} \\ x_j + 1 \text{ for all nodes } j \text{ of the subtree} \\ \text{having the root of bunsetsu } i) \\ \text{(when bunsetsu } i \text{ is included in the} \\ \text{right subtree of the tree)} \end{cases}$$

(respective y coordinates are invariable).

It is to be noted that, in the calculation of the longest path in the above-described adjustment rules (b), bunsetsu nodes having parallel modification relation in the paths are not counted.

After performing the above-described calculation, the following adjustment (c) is performed in order to perform correction when the entire sentence-structure diagram is shifted to the right by this processing.

Adjustment (c):

It is assumed that $a=\min (x_i)$ for $1 \leq i \leq N$. When $a>1$, $x_i=x_i-a+1$ for $1 \leq i \leq N$.

In the present case, $Q_5=6$ (bunsetsu $i=5$ modifies the immediately next bunsetsu 6) for bunsetsu $i=5$ having the modification relation $T_i$=parallel, and the length of path $P_2=\{3, 4, 5, 6, 8\}$ including bunsetsu $i=5$ is 4 (the value 4 is selected because bunsetsu nodes having $T_i=$ parallel are not counted in the calculation of the longest path when the adjustment rule (b) is applied), and is the longest path. Hence, arrangement coordinates $(x_j, y_j)$ are calculated again for bunsetsus j ($6 \leq j \leq 8$) which are behind bunsetsu $i=5$.

$x_6=x_6-1=4-1=3$ $y_6=y_6+1=2+1=3$ $x_7=x_7-1=4-1=3$ $y_7=y_7+1=3+1=4$ $x_8=x_8-1=5-1=4$ $y_8=y_8+1=3+1=4.$

Since there are no bunsetsus having the modification relation $T_i$=parallel except bunsetsu $i=5$ and therefore min $(x_i)=x_1=1$, the adjustment (c) is not needed. Hence, step S3 is terminated.

As a result of step S3, the final arrangement coordinates of the sentence-structure diagram become as shown in FIG. 11(c).

Finally, at step S4, the sentence-structure diagram is formed and displayed on the display unit 7 using the representations shown in FIG. 5, according to the arrangement coordinates shown in FIG. 11(c) calculated at step S3 and the modification relation shown in FIG. 4 obtained at step S2, and the processing is terminated.

Figure 6:
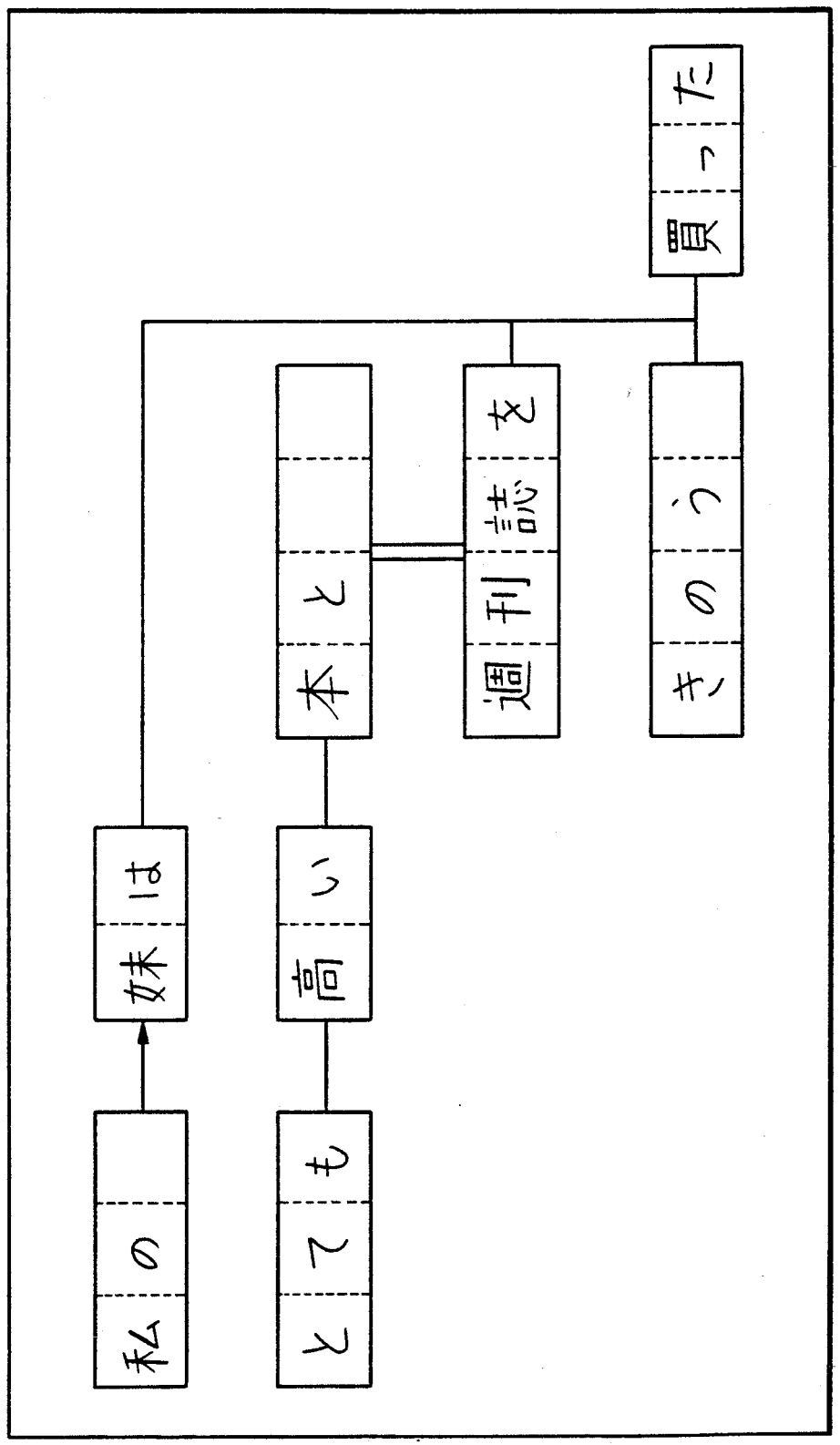
FIG. 6 is a diagram showing an example of the sentence-structure diagram displayed on a picture surface.

FIG. 6 is an example of the display of the sentence-structure diagram displayed at step S4.

Figure 10:
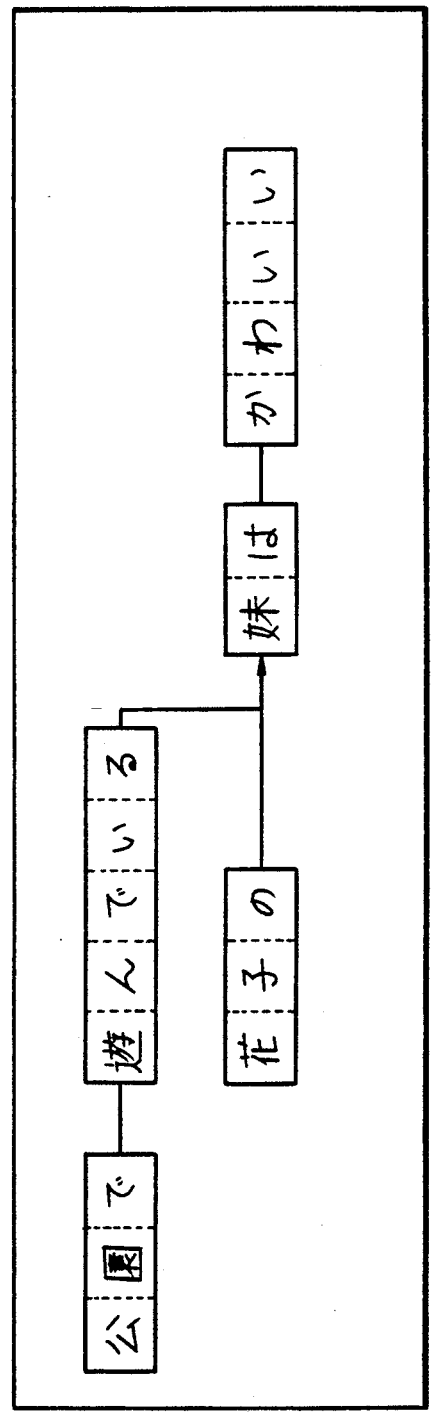
FIG. 10(a) and 10(b) are diagrams showing examples of the sentence-structure diagram.
Figure 10B:
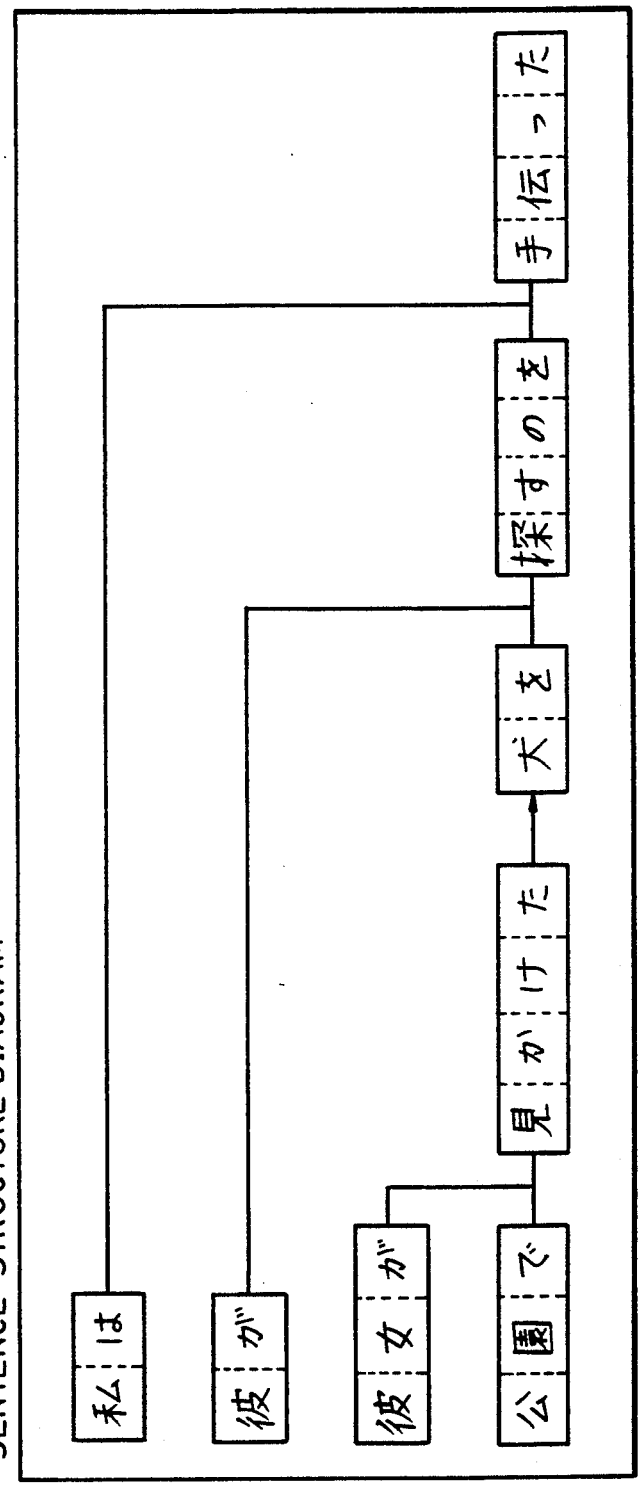

FIG. 10(b) is a diagram showing an example of the display of the sentence-structure diagram for the other sentence, and relates to a padded sentence.

As seen in FIGS. 6, 10(a) and 10(b), according to the sentence-structure diagram of the present invention, it becomes possible to represent the sentence structure so that it is possible to discriminate to which relation among rentai modification relation, renyou modifcation relation, parallel relation between noun phrases, and the like the kakariuke relation between bunsetsus belong while maintaining the word order in a sentence, and to straightforwardly represent the distance between bunsetsus in kakariuke relation with each other.

Accordingly, it is possible to know portions where bunsetsus are used in parallel in a sentence having vagueness, as shown in FIG. 10(a), or to understand how far the distance between bunsetsus in kakariuke relation with each other is in a padded sentence, as shown in FIG. 10(b).

Although, in FIG. 6 of the of the above-described embodiment, the sentence structure is displayed according to the display method shown in FIG. 5, any other method may also be used provided that the kind of modification relation can be discriminated.

Furthermore, when the apparatus determines that a plurality of interpretations may arise in kakariuke relation, those interpretations may be simultaneously displayed, or may be sequentially displayed by being switched.

Next, an example of realizing the above-described embodiment by program control will be explained.

Figure 12:
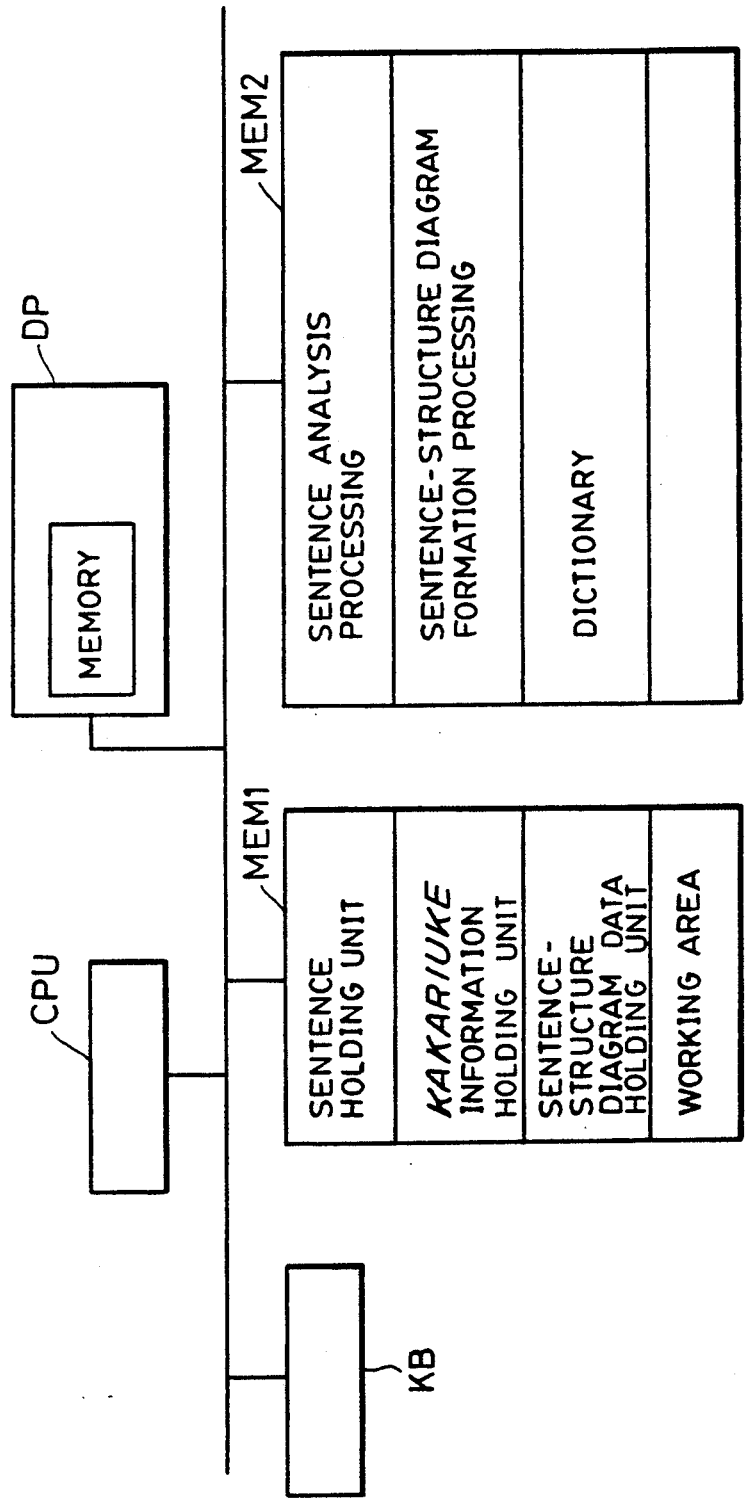
FIG. 12 is a block diagram of a text processing apparatus for the sentence-structure diagram formation processing according to another embodiment.

FIG. 12 is a block diagram of the configuration of the apparatus of the present embodiment.

In FIG. 12, a processing unit CPU executes processing in accordance with control procedure, which will described later. An input unit KB includes a mouse and a keyboard. A memory MEM1 includes a sentence holding unit for holding a sentence as shown in FIG. 3, a kakariuke information holding unit, a sentence structure holding unit, and a working area for holding processed data.

A memory MEM2 includes a sentence analysis processing, a sentence structure transformation processing, a word dictionary, and an area for storing procedures shown in FIGS. 2 and 7.

A display unit DP includes a memory for storing data to be displayed.

The operation of the apparatus having the structure as described above will now be explained with reference to the drawings of the embodiment described before.

First, processes of the sentence-structure diagram formation processing in the present embodiment will be explained with reference to the flowchart shown in FIG. 2.

At step S1, it is confirmed whether or not a sentence is held in the sentence holding unit in the memory MEM1. Step 1 is repeated until a sentence is held in the sentence holding unit. FIG. 3 is a diagram showing an example of the sentence held in the sentence holding unit. An explanation will be hereinafter provided using this example of the sentence.

Next, at step S2, the sentence held in the sentence holding unit in the MEM1 is analyzed by the processing unit CPU while referring to the dictionary in the memory MEM2. The kakariuke information obtained is held in the kakariuke information holding unit in the memory MEM1 in a form as shown in FIG. 4.

Next, at step S3, the processing unit CPU forms a diagram showing the structure of the sentence based on the kakariuke information held in the kakariuke information holding unit in the memory MEM1.

FIG. 7, composed of FIGS. 7(a) and 7(b), shows a detailed flowchart of the sentence-structure diagram formation processing at step S3 shown in FIG. 2.

First, at step S701, the processing unit CPU forms tree-structure data of kakariuke having a node of each bunsetsu according to the kakariuke information held in the kakariuke information holding unit in the memory MEM1. FIG. 8 is a diagram showing an example of the tree-structure data of kakariuke formed at step S701.

Next, at step S702, the processing unit CPU calculates the initial coordinate ($x_i$, $y_i$) of each bunsetsu i in the sentence-structure diagram. FIG. 11(a) shows the calculated initial coordinates of respective bunsetsus.

Next, at steps S703-707, all nodes in the right subtree having roots of respective nodes are arranged from the right end in order to make the sentence-structure diagram easier to see and to understand.

For that purpose, the processing unit CPU determines nodes the coordinates of which must be adjusted, calculates values to adjust, and executes the adjustment.

At steps S708-709, bunsetsus having parallel relation with one another are arranged one above another so that the parallel relation can be easily grasped.

For that purpose, the processing unit CPU determines bunsetsu nodes having parallel relation with each other according to the kakariuke information held in the kakariuke information holding unit in the memory MEM1, calculates values to adjust, and executes the adjustment.

As a result of the process at step S3, the final arrangement coordinates of the sentence-structure diagram become as shown in FIG. 11(c).

In the above-described processing, the processing is performed while temporarily holding data on the working area.

Finally, at step S4, the sentence-structure diagram as shown in FIG. 6 is formed and displayed on the display unit DP using the representation shown in FIG. 5, according to the arrangement coordinates shown in FIG. 11(c) calculated at step S3 and the modification relation shown in FIG. 4 obtained at step S2, and the processing is terminated.

As explained above, according to the present invention, by displaying a sentence-structure diagram reflecting kakariuke relation in a sentence, it becomes possible to easily visually grasp the structure of the sentence, that is, kakariuke relation, the distance (close or far) between two bunsetsus in kakariuke relation with each other, and the like.

As a result, when there may arise an interpretation of kakariuke relation which is different from what the author intended, the user can easily notice the fact. Furthermore, the user can easily detect a padded sentence which is one of factors to make the meaning of a sentence difficult to understand, and the like according to the shape of a sentence-structure diagram. Thus, the present invention has the effect that it is possible to easily discover portions which are unsuitable from the viewpoint of expression in a sentence.

Next, the processing to correct an original sentence by an editing operation on a sentence-structure diagram will be explained.

Figure 13:
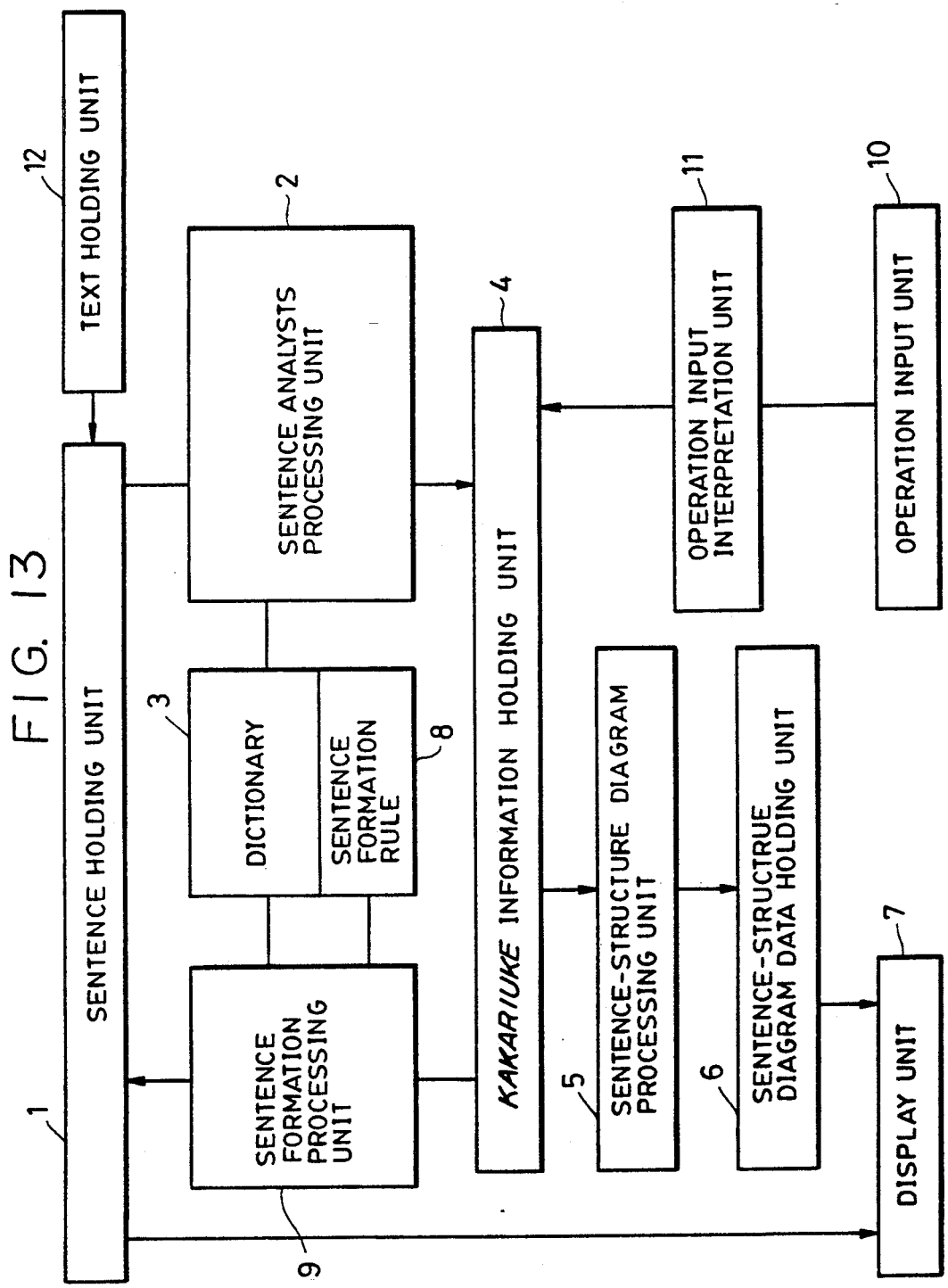
FIG. 13 is a block diagram of a text processing apparatus for the sentence-structure diagram correction processing according to an embodiment.

FIG. 13 shows a block diagram of the configuration of an apparatus.

In FIG. 13, a sentence formation rule region 8 is provided in a dictionary 3. In this region 8, grammar rules and the like utilized when a sentence is formed in a sentence formation processing unit 9 are described.

An operation input unit 10 receives the assignment and instruction from the user for data displayed on a display unit 7. An operation input interpretation unit 11 interprets the contents of an input from the operation input unit 10.

A text holding unit 12 holds a text. A sentence in the text held in the text holding unit 12 is assigned and held in a sentence holding unit 1.

The functions of other units shown in FIG. 13 are identical to those shown in FIG. 1.

Figure 14B:
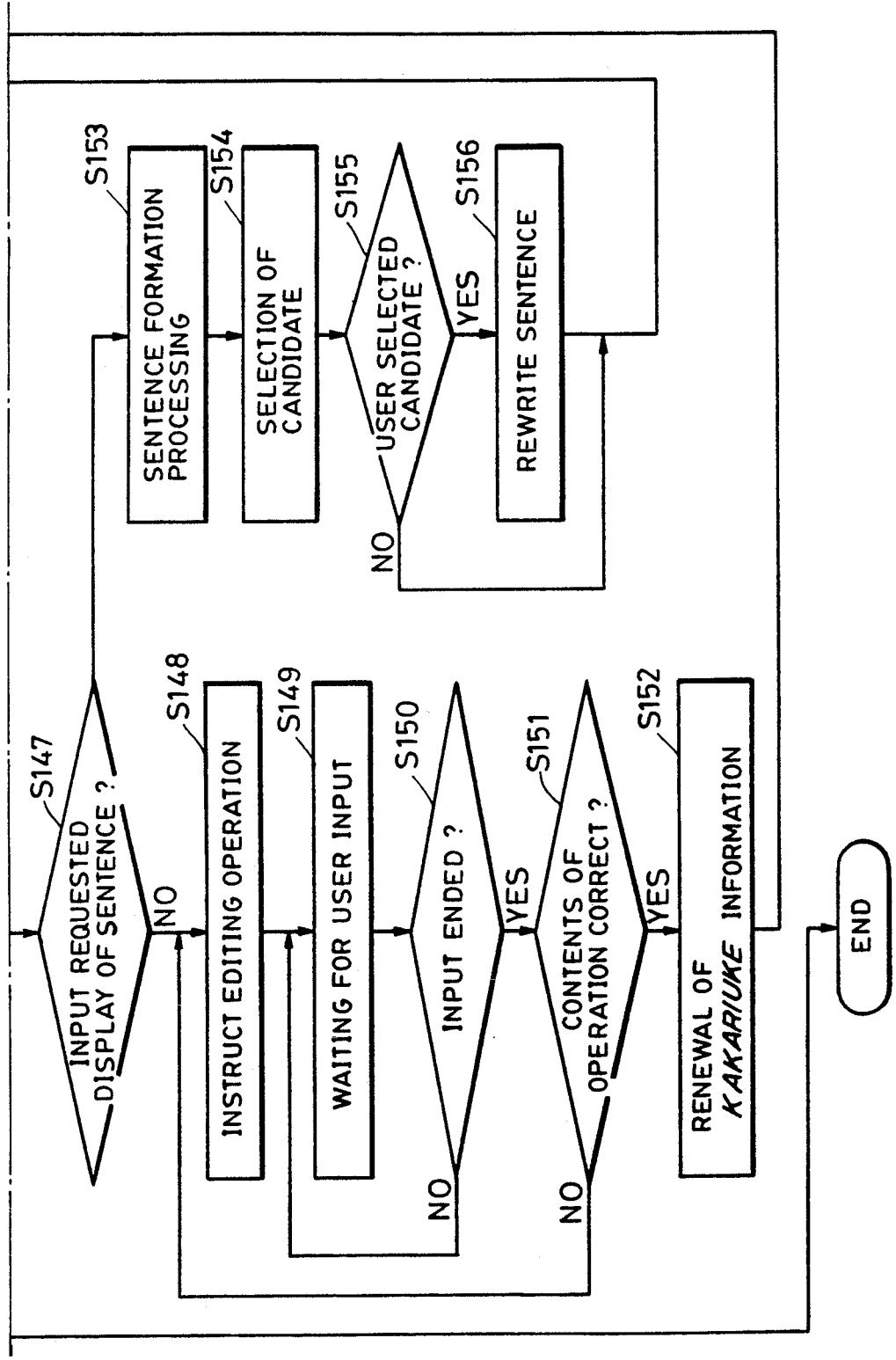

FIG. 14 is a flowchart of the correction processing of a sentence in the present embodiment.

When starting this processing, it is assumed that the assigned sentence in the text held in the text holding unit 12 is held in the sentence holding unit 1.

First, at steps S141-143, a sentence-structure diagram for the sentence held in the sentence holding unit 1 is formed, and displayed on the display unit 7. Since this processing is identical to the processing explained for the flowchart shown in FIG. 2, an explanation thereof will be omitted.

Next, at step S144, an editing input from the user is waited for. At step S145, the existence of an input is checked, and steps 144 and step 145 are repeated until an input is provided. This input is from the operation input unit 10. In this case, the input is executed by the selection of a menu from menus by a mouse. When there is an input, the process proceeds to step S146, where it is checked whether or not the input requests the end of an editing operation. If the check result is affirmative, the processing is terminated. If the check result is negative, the input corresponds to a certain command relative to an editing operation. In this case, it is assumed that there are three kinds of commands, that is, (1) the change of bunsetsus to be modified, (2) the change of word order, and (3) the display of the sentence. At step S147, it is checked whether or not the input requests the display of the sentence.

When the input has not requested the display of the sentence, an operation is instructed to the user in accordance with the requested command, at step S148. This operation is performed, for example, by displaying a message on the picture surface. For example, in the case of changing bunsetsus to be modified by respective bunsetsu, an operation is instructed to assign a bunsetsu whose modifying bunsetsus intended to change and a new bunsetsu intended to change to. Next, at steps S149 and S150, an input from the user is waited for. This processing is repeated until there is an input from the user. The input from the user is performed, for example, by clicking the portion of the bunsetsu to be assigned on the sentence-structure diagram by the mouse. If there has been an input from the user, it is confirmed if the contents of the input are correct at step S151. When the input is not conformed to the instruction or any editing operation of the sentence-structure diagram cannot be performed according to the contents of the input, the process returns again to step S148. When the contents of the operation have been correct at step S151, the contents of the kakariuke information holding unit 3 are renewed in accordance with the input, at step S152. The process then returns to step S142, where the sentence-structure diagram formation processing is performed according to the renewed kakariuke information.

On the other hand, when the input from the user requests the display of the sentence at step S147, the sentence formation processing is performed at step S153. In this processing, a surface sentence (a sentence in a normal form) is formed by the sentence formation processing unit 9 using the kakariuke information currently held in the kakariuke information holding unit 3. The formed surface sentence is held in the sentence holding unit 1, and displayed on the display unit 7.

The sentence formation processing unit 9 uses the dictionary 3, in particular, the sentence formation rule 8. Any methods which are generally known may be used for forming the sentence. The sentence formation rule 8 is a rule for forming a sentence that is easier to read. For example, it is possible to consider rules for the addition of punctuation points shown in FIG. 15, rules for the change of word order shown in FIG. 16, and the like. (Relative to such rules for making a sentence easier to read, refer, for example, to "Technique of Japanese composition" by Katsuichi Honda, Asahi newspaper company, 1982.)

Since a plurality of surface sentences are generally formed from one unit of kakariuke information, the user is requested to select one from among them at step S154. For this purpose, a plurality of candidates, for example, may be displayed at the same time and one among them may be selected, or candidates may be displayed by being switched one by one and one may be selected. Any arbitrary method may be used for the selection of a candidate. Next, at step S155, it is checked if the user has selected a candidate. When the user has seleted a candidate, the original sentence held in the text holding unit 12 is replaced by the sentence selected by the user, at step S156. The sentence is thereby rewritten. The step then returns to step S144. When a candidate has not been selected at step S155, the process returns to step S144.

Figure 19:
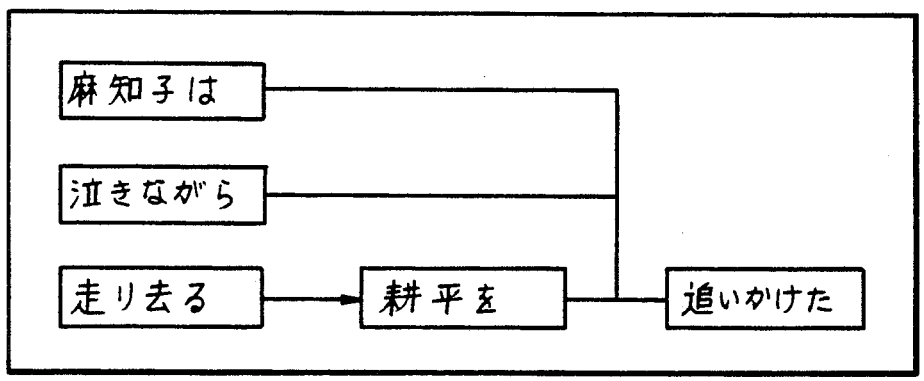

Next, the procedure to rewrite a sentence according to the present embodiment will be explained with reference to the sentence "麻知子は泣きながら走り去る耕平を追いかけた" shown in FIG. 17. As a result of the processing of this sentence held in the sentence holding unit 1 by the sentence analysis processing at step S141, the kakariuke information as shown in FIG. 18 is held in the kakariuke information holding unit 4. This kakariuke information is converted into sentence-structure diagram data (step S142), and is displayed as a sentence-structure diagram (step S143) as shown in FIG. 19. For the sentence shown in FIG. 17, there exist two kinds of interpretations, that is, "Machiko chased Kouhei who was running away with weeping" and "Machiko chased Kouhei who was running away, with weeping". If it is assumed that the author intended that "泣きながら" (with weeping) modifies "走り去る" (running away), the diagram shown in FIG. 19 is not conformed to the intention of the author, but a sentence structure diagram which is based on a different interpretation is displayed.

Figure 20:
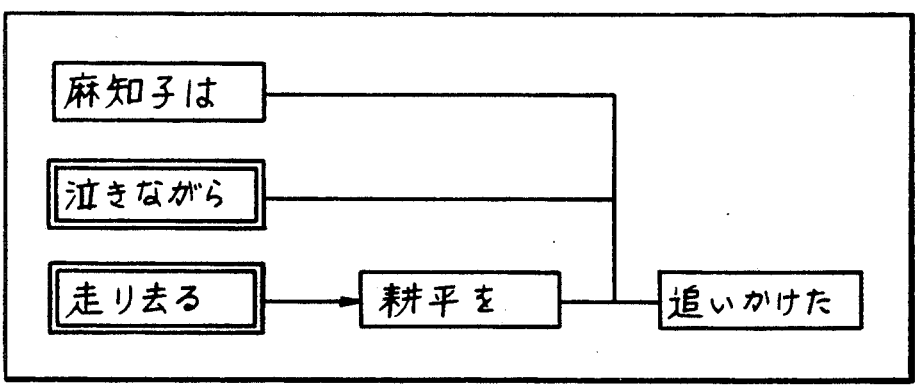
Figures 21, 22:
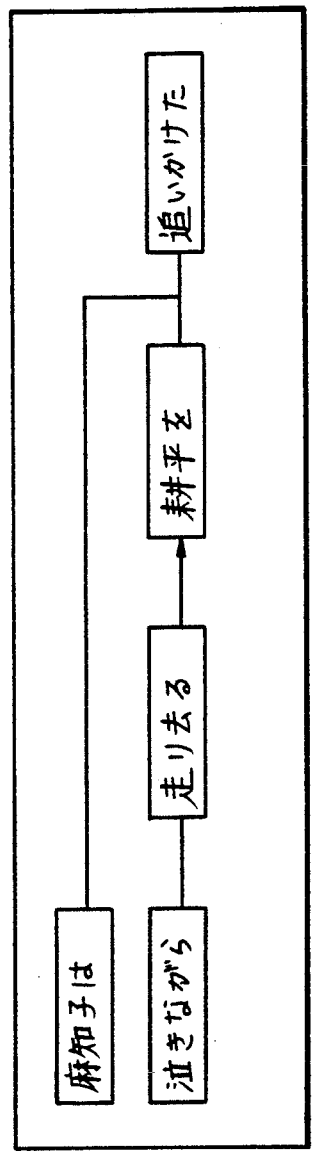

Accordingly, the user assigns "the change of a bunsetsu to be modified" in order to form a sentence-structure diagram based on the correct interpretation. The system side then instructs to assign a bunsetsu whose modifying bunsetsu intended to change and a bunsetsu to be newly modified (step S148). The user then assigns "泣きながら" to modify "走り去る" in accordance with the instruction, as shown in FIG. 20 (the assigned bunsetsus are surrounded by double lines). The kakariuke information in the kakariuke information holding unit is renewed in accordance with this assignment (step S152). The result is shown in FIG. 21. The sentence-structure diagram rewritten at steps S142 and 143 in accordance with the kakariuke information shown in FIG. 21 is shown in FIG. 22.

Figures 23, 24:
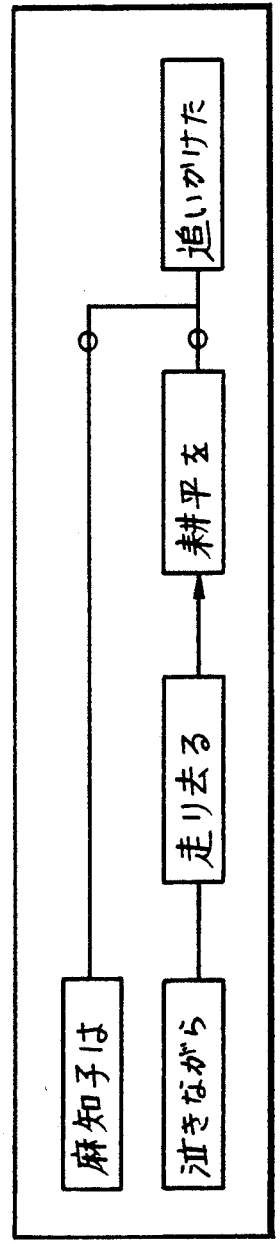

Subsequently, when the display of the surface sentence is instructed, the sentence shown in FIG. 23, which corresponds to the sentence-structure diagram shown in FIG. 22, is formed as a result of the sentence formation processing at step S153. In this sentence, a punctuation point is added after "麻知子は" in accordance with rules for the addition of punctuation points shown in FIG. 15.

Referring again to FIG. 22, it can be understood that "麻知子は" is far from "追いかけた", a bunsetsu to be modified. Hence, it is intended to change the order of two modification phrases modifying "        ". For that purpose, when the user instructs the change of the word order, the system side instructs to assign sets of bunsetsus whose order in the sentence is to be exchanged, at step S148. In response to this instruction, the user assigns the solid lines each of which indicating the modification relation between the set of bunsetsus to be exchanged and the bunsetsu to be modified by performing clicking operations by the mouse. A state in which this processing has been performed is shown in FIG. 24. The portions indicated by ◯ have been assigned.

Figures 25, 26:
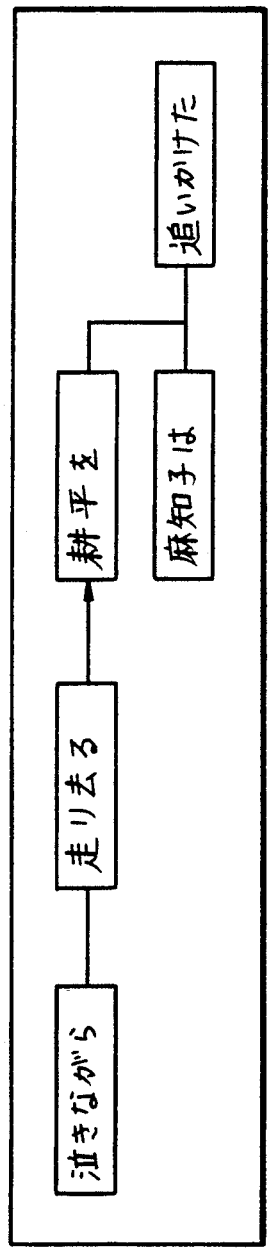

When the above-described change has been executed, the contents of the kakariuke information holding unit 3 are renewed, and the sentence-structure diagram is rewritten (see FIG. 25), in the same manner as described before. The surface sentence corresponding to the rewritten diagram is displayed as shown in FIG. 26. When this surface sentence has been selected, the sentence held in the text holding unit 12 is replaced by the sentence shown in FIG. 26.

By performing the processing as described above, it is possible to correct a sentence in a form easier to understand by a simple operation for a displayed sentence-structure diagram.

Next, an example of realizing the above-described example by program control will be explained.

Figure 27:
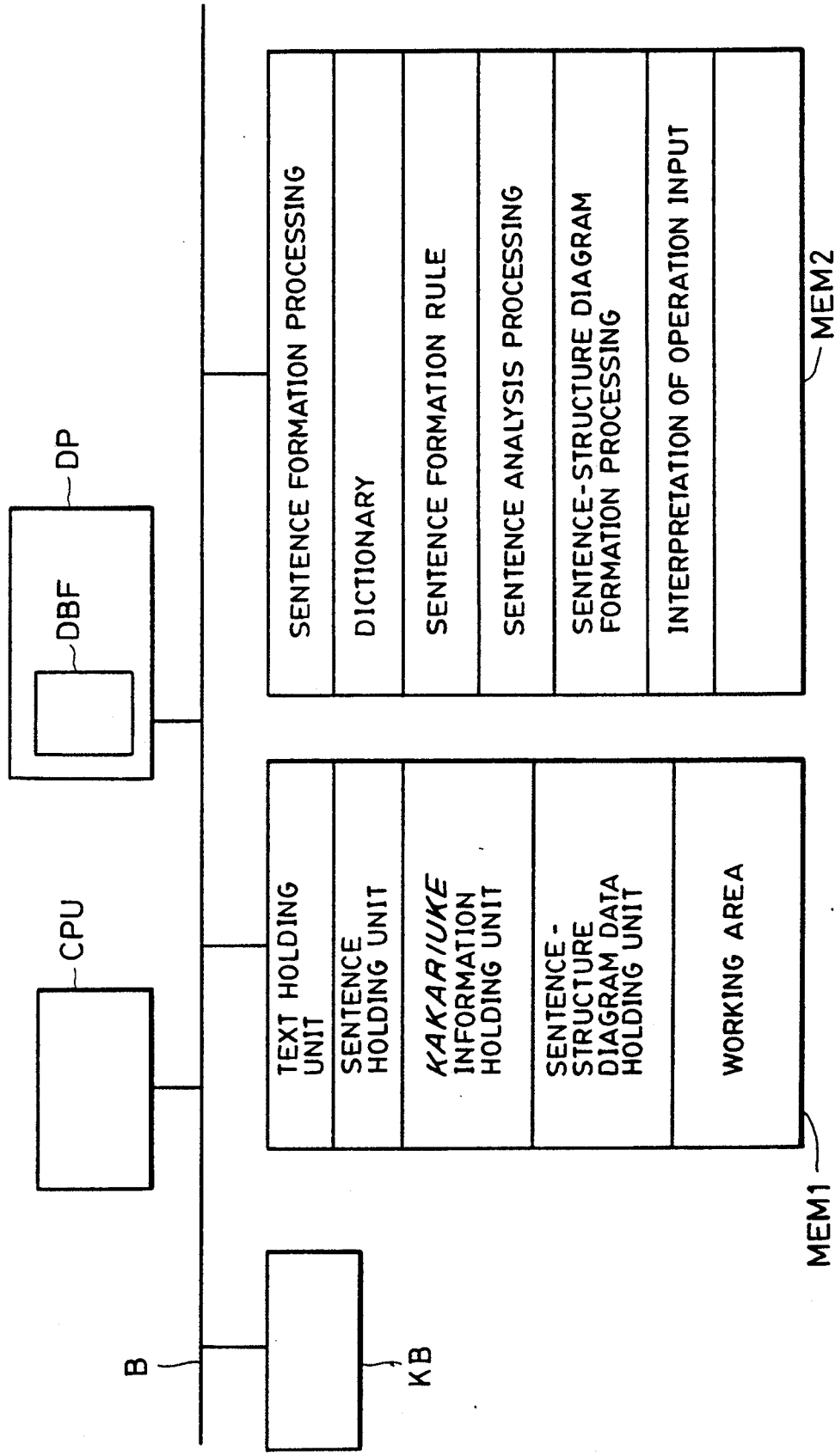
FIG. 27 is a block diagram of a text processing apparatus for the sentence-structure diagram correction processing in another embodiment.

FIG. 27 is a block diagram of an apparatus used for that purpose. FIG. 27 only differs from FIG. 12 in that the MEM1 includes a text holding unit, the MEM2 includes a sentence formation rule, an operation input interpretation procedure and a procedure shown in FIG. 28, and the input unit KB includes a mouse.

The procedure of the processing shown in FIG. 28 will be hereinafter explained. The functions and effects of other different points are as shown in the embodiment described before.

The operation of the above-described embodiment will now be explained with reference to the example of the sentence described before and the like.

First, at step S200, a sentence in the text held in the text holding unit in the memory MEM1 and displayed on the display unit DP is assigned by a cursor and held in the sentence holding unit. At step S201, the sentence is analyzed by the processing unit CPU, and the result is held in the kakariuke information holding unit in the MEM1. At this step, the sentence held in the sentence holding unit in the memory MEM1 is divided into words referring to the dictionary in the memory MEM2. The words are then grouped into bunsetsus, and analysis is performed as to which bunsetsu each bunsetsu modifies, whether the modification relation is renyou modification or rentai modification, and the like.

Next, at step S202, the kakariuke information held in the kakariuke information holding unit in the memory MEM1 is converted into data of a sentence-structure diagram by the processing unit CPU, and the data are held in the sentence-structure diagram data holding unit in the memory MEM1. The data held in the sentence-structure diagram data holding unit in the memory MEM1 are sent to the display unit DP at step S203, and the sentence-structure diagram is displayed making a window on the picture surface on which the surface sentence is displayed.

At step S204, an editing input from the user is waited for. At step S205, the existence of an input is checked, and steps S204 and S205 are repeated until there is an input. This input is an input from the input unit KB. In this case, a menu selection method is adopted in which a menu is selected from menus displayed on the display unit DP by a mouse of the input unit KB. When there is an input, the process proceeds to step S206, where it is checked whether or not the input requests the end of an editing operation. If the check result is affirmative, the processing is terminated. If the check result is negative, the input corresponds to a certain command relative to an editing operation. In this case, it is assumed that there are three kinds of commands, that is, (1) the change of bunsetsu to be modified, (2) the change of word order, and (3) the display of the sentence, as in the embodiment described before. At step S207, it is checked whether or not the input requests the display of the sentence.

When the input has not requested the display of the sentence, an operation to perform is instructed to the user in accordance with the requested command, at step S208. This operation is performed, for example, by displaying a message on the display unit DP. For example, in the case of changing a bunsetsu to be modified, the user is instructed to assign a bunsetsu whose modifying bunsetsus intended to change and a new bunsetsu intended to change to. Next, at steps S209 and S210, a waiting operation is performed until ther is an input from the user. The input from the user is performed, for example, by clicking the portion of a bunsetsu to be assigned on the sentence-structure diagram displayed on the display unit DP by the mouse of the input unit KB. If there is an input from the user, it is confirmed if the contents of the input are correct at step S211. When the contents are not correct, the process returns again to step S208. When the contents are correct, the contents of the kakariuke information holding unit in the memory MEM1 are renewed in accordance with the input, at step S212. The process then returns to step S202, where the sentence-structure diagram formation processing is performed by the processing unit CPU according to the renewed kakariuke information. Subsequently, the reedited sentence is displayed on the display unit DP.

On the other hand, when the input from the user has requested the display of the sentence at step S207, the sentence formation processing is performed at step S213. In this processing, a surface sentence is formed by the processing unit CPU using the kakariuke information held in the kakariuke information holding unit in the memory MEM1. The formed surface sentence is held in the sentence holding unit in the memory MEM1, and is sent to and displayed on the display unit DP. In the sentence formation processing, the sentence formation rule is used in addition to the dictionary in the memory MEM2. The sentence formation rule is a rule for forming a sentence that is easier to read. For example, it is possible to consider the rules for the addition of punctuation points and the rules for the change of word order described before, and the like.

Since a plurality of surface sentences are generally formed from one unit of kakariuke information, the user is requested to select one surface sentence from among them at step S214. For this purpose, a plurality of candidates may be displayed at the same time and one among them may be selected, or candidates may be displayed one by one and one may be selected. As the method of the selection of a candidate, the candidate may be selected by a cursor, or according to a number. Next, at step S215, it is checked if the user has selected a candidate. When the user has selected a candidate, the original sentence held in the text holding unit in the memory MEM1 is replaced by the sentence selected by the user, at step S216. The sentence is thereby rewritten. The step then returns to step S204. When a candidate has not been selected at step S215, the process returns to step S204.

A further explanation of the present embodiment will now be provided illustrating a case in which the sentence shown in FIG. 17 is held in the sentence holding unit in the memory MEM1. As a result of the sentence analysis processing at S201, the kakariuke information as shown in FIG. 18 is held in the kakariuke information holding unit in the memory MEM1. This kakariuke information is converted into a sentence-structure diagram data (S202), and is displayed as a sentence-structure diagram (S203) as shown in FIG. 19. If the author intended that "泣きながら" modifies "走り去る", the displayed diagram is not conformed to the author's intention. Hence, the user instructs the operation of "the change of bunsetsu to be modified". The system side then instructs the user to assign a bunsetsu intending to change a bunsetsu to modify and a new bunsetsu to be modified (S208). The result of the operation by the user in accordance with the instruction is shown in FIG. 20. In FIG. 20, it is instructed that "泣きながら" modifies "走り去る" (shown by  ). The kakariuke information is renewed in accordance with the instruction shown in FIG. 20 (S212), as shown in FIG. 21. The sentence-structure diagram is rewritten in accordance with the kakariuke information shown in FIG. 21 (S202, S203), as shown in FIG. 22. If it is then instructed to display the surface sentence which corresponds to the sentence structure shown in FIG. 22, a sentence shown in FIG. 23 is formed as a result of the sentence forming processing S153. In FIG. 23, a punctuation point is added after "麻知子は" according to the rules for the addition of punctuation points shown in FIG. 15.

In FIG. 22, if it is intended to change the order of two modification phrases modifying "追いかけた", the user instructs the change of the word order from the input unit KB (the mouse) at step S204. Then, at step S208, the user is instructed to assign phrases to the word order which are to be changed. In accordance with the instruction, the user assigns the solid lines indicated by ○ in FIG. 24. This assignment is performed by clicking the solid lines indicating the modification relation by the mouse. As in the case described before, the contents of the kakariuke information holding unit are renewed, adn the sentence-structure diagram is rewritten in accordance with the contents, as shown in FIG. 25. If the surface sentence corresponding to the sentence-structure diagram shown in FIG. 25 is displayed, the sentence shown in FIG. 26 is formed. If this surface sentence is selected, the sentence, shown in FIG. 17, held in the sentence holding unit in the memory MEM1 is replaced by the sentence shown in FIG. 26.

By performing the processing as described above, it is possible to obtain the effect that a sentence can be re-written in a form easier to understand by a simple operation on a sentence-structure diagram.

The form of the sentence-structure diagram may be different from the form composed of boxes, solid lines and arrows, as shown in the embodiments. For example rentai modification may be represented by →, and re-nyou modification may be represented by  .

Although, in the embodiments, an operation input is performed by a mouse, an input may also be from a keyboard, or from any other means. Furthermore, an input may be by the mixture of these means.

Although, in the embodiments, a kakariuke analysis is used as the sentence analysis method, any other method may also be used provided that the kakariuke information identical to that in the embodiments is output.

Although, in the embodiments, three kinds of operations by the user, that is, the change of a bunsetsu to modify, the change of word order and the display of a sentence, are considered, any other operation may be added, or a part of the above-described operations may be used.

Although, in the embodiments, as the sentence formation rule, rules for the addition of punctuation points and rules for the change of word order have been considered, any other rules may further be added, or a part of the above-described rules may be used.

In the above-described embodiments, in forming sentence-structure diagrams for a sentence for which a plurality of interpretations exist, one of the diagrams is displayed, and in order to obtain a sentence-structure diagram based on a different interpretation, the operation of the change of a bunsetsu to be modified is performed on the display. When a plurality of interpretations exist, however, sentence-structure diagrams based on respective interpretations may be simultaneously or sequentially displayed, the user may select one of them, and the apparatus may change to a sentence suitable for the interpretation which corresponds to the selected sentence-structure diagram.

As explained above, according to the present invention, it becomes possible to form a sentence-structure diagram representing a structure based on modification relation between composing elements of a sentence from the sentence, to perform correction for the sentence-structure diagram thus formed, if necessary, and a selection from among a plurality of sentence-structure diagrams, and to correct the original sentence in a suitable form according to a sentence-structure diagram settled by the confirmation of the user.

Next, the procedure of the sentence-structure diagram forming processing in the case of English will be explained.

Also in the case of English, in the apparatus having the configuration shown in FIG. 1, it is possible to form a sentence-structure diagram in accordance with the processing procedure of the flowchart shown in FIG. 2, in almost the same manner as in the embodiments for Japanese sentences.

The sentence-structure diagram formation processing for an English sentence will be hereinafter explained according to the flowchart shown in FIG. 2 using the apparatus shown in FIG. 1 laying emphasis on differences from a corresponding Japanese sentence, illustrating a sentence "Yesterday I say a girl with a telescope".

First, at step S1, it is confirmed if a sentence is held in the sentence holding unit 1. Step 1 is repeated until a sentence is held in the sentence holding unit 1.

Next, at step S2, the sentence held in the sentence holding unit 1 is analyzed, and the result is held in the kakariuke information holding unit 4. At this step, in the case of Japanese, the sentence held in the sentence holding unit 1 is grouped into bunsetsus referring to the dictionary 3. Also in the present embodiment which treats English, by, for example, dealing with articles and the like as one body together with a noun to which they are added, composing elements of the sentence are grouped into words, phrases and the like. These groups will be hereinafter termed "bunsetsus" as in the case of Japanese. Furthermore, in the present case, for the convenience of disposition, a dummy bunsetsu (s) is provided at the head of the sentence.

FIG. 29 is a diagram representing the correspondence between bunsetsus and bunsetsu numbers, when the sentence held in the sentence holding unit 1 is divided into bunsetsus according to the above-described method, and bunsetsu numbers are provided for respective bunsetsus.

At step S2, it is checked with bunsetsu each bunsetsu modifies. This modification relation is also called kakariuke relation after the model of Japanese, and the information is held in the kakariuke information holding unit 4. In the above-described example of the sentence, two interpretations may be considered, that is, a case in which bunsetsu "with" modifies "saw" and a case in which bunsetsu "with " modifies "a girl". First, the former case will be explained.

As the kakariuke relation in the sentence-structure diagram formation processing in English, for convenience, only the relation modifying a left-side bunsetsu is considered. It is assumed that, although various kinds of kakariuke relation may be considered, the user may freely set any kakariuke relation provided that the above-described principle is satisfied.

In kakariuke relation in the present embodiment, it is assumed that, in particular, bunsetsus representing time and the subject of the sentence modifies bunsetsu (s) and verbs modify the subject. Furthermore, in the present embodiment, as in the case of Japanese, it is analyzed whether the modification relation is renyou modification (which modifies a word or a phrase corresponding to a verb or an adjective—adverb-like modification), rentai modification (which modifies a word corresponding to a noun—adjective-like modification) or the like, and the result is held in the kakariuke information holding unit 4. In this case, a case when a verb modifies the subject is also made renyou modification. Consequently, for a verb having an identical word for the past and past-participle tenses, discrimination is provided in that the past tense of the verb modifying the subject is renyou modification and the past-participle tense of the verb modifying a noun is rentai modification.

FIG. 31 is a diagram showing representations on a sentence-structure diagram for the modification relation between bunsetsus.

FIG. 30($a$) is a diagram showing an example of the information to be held in the kakariuke information holding unit 4 as a result of the process at step S2 of the sentence analysis processing.

Next, at step S3, a diagram showing the structure of the sentence is formed according to the kakariuke information held in the kakariuke information holding unit 4.

Figure 32:
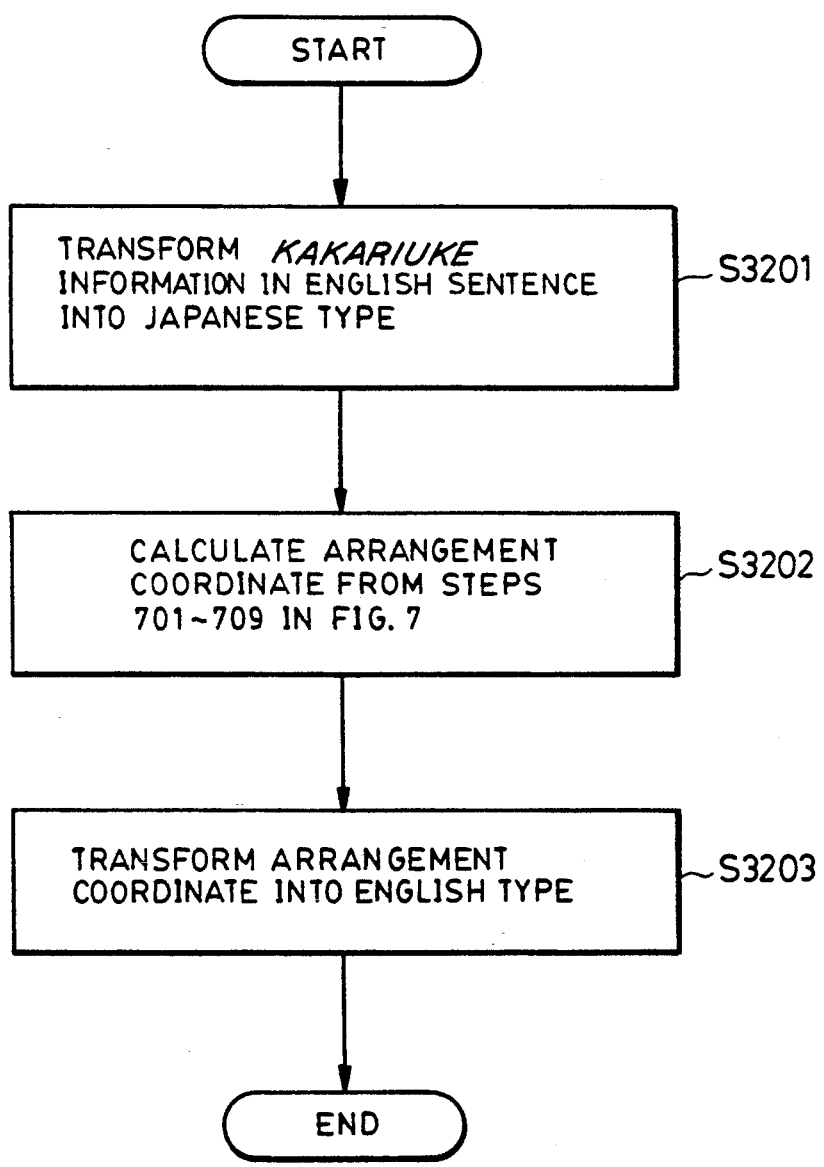
FIG. 32 is a flowchart representing the procedure of the sentence-structure diagram formation processing.

FIG. 32 is a flowchart showing an example of the detailed procedure of the sentence-structure diagram forming processing at step S3 in the present embodiment. The concrete processes of the sentence-structure diagram forming processing in the present embodiment will now be explained with reference to this flowchart.

First, at step S3201, in the kakariuke information table for the English sentence, shown in FIG. 30($a$), held in the kakariuke information holding unit 4, bunsetsu numbers are changed in accordance with the following calculation formulae (d). The kakariuke information table is thus converted into a form capable of utilizing the sentence-structure diagram forming processing procedure for Japanese shown in FIGS. 7($a$) and 7($b$).

$$\text{New } i = N - i + 1 \quad (1 \leq i \leq N)$$
$$\text{New } Q_i = N - Q_i + 1 \quad (1 \leq i \leq N).$$

In the above-described formulas, N represents the total number of bunsetsus, New i represents a new bunsetsu number for a bunsetsu having the original bunsetsu number i, and New $Q_i$ represents the number of a new bunsetsu to be modified by the bunsetsu having the original bunsetsu number i. That is, according the processing by the calculation formulae (d), each bunsetsu is rewritten in the reverse order of the bunsetsu number. FIG. 30($b$) is a table provided by rewriting the kakariuke information table shown in FIG. 30($a$) in accordance with the calculation formulas (d).

Next, a step S3202, arrangement coordinates are calculated at steps S701–709 shown in FIG. 7. As a result, the arrangement coordinates shown in FIG. 33($a$) are obtained.

Next, at step S3203, the arrangement coordinates obtained at step S3202 are converted into arrangement coordinates suitable for English by calculating in accordance with the following calculation formulas (e).

Calculation formulas (e):

$$x_{NEW\,i} = X - x_{N-i+1} + 1 \quad (1 \leq i \leq N)$$
$$y_{NEW\,i} = Y - y_{N-i+1} + 1 \quad (1 \leq i \leq N).$$

In the above-described formulas, N and New i are identical to those in the formulas (d), X represents the value of the x coordinate of the last bunsetsu in the original arrangement coordinate, and Y represents the value of the y coordinate of the last bunsetsu in the original arrangement coordinate. By the processing according to the calculation formulas (e), each bunsetsu is rewritten in an arrangement coordinate so that the order of the bunsetsu number is reversed again.

FIG. 33($b$) is a diagram in which the arrangement coordinates shown in FIG. 32($a$) are rewritten according to the calculation formulae (e).

The sentence-structure diagram forming processing at step S3 is thus terminated.

Finally, at step S4, the sentence-structure diagram is displayed on the picture surface. The sentence-structure diagram obtained from the arrangement coordinates shown in FIG. 33($b$) is shown in FIG. 34.

Figure 37:
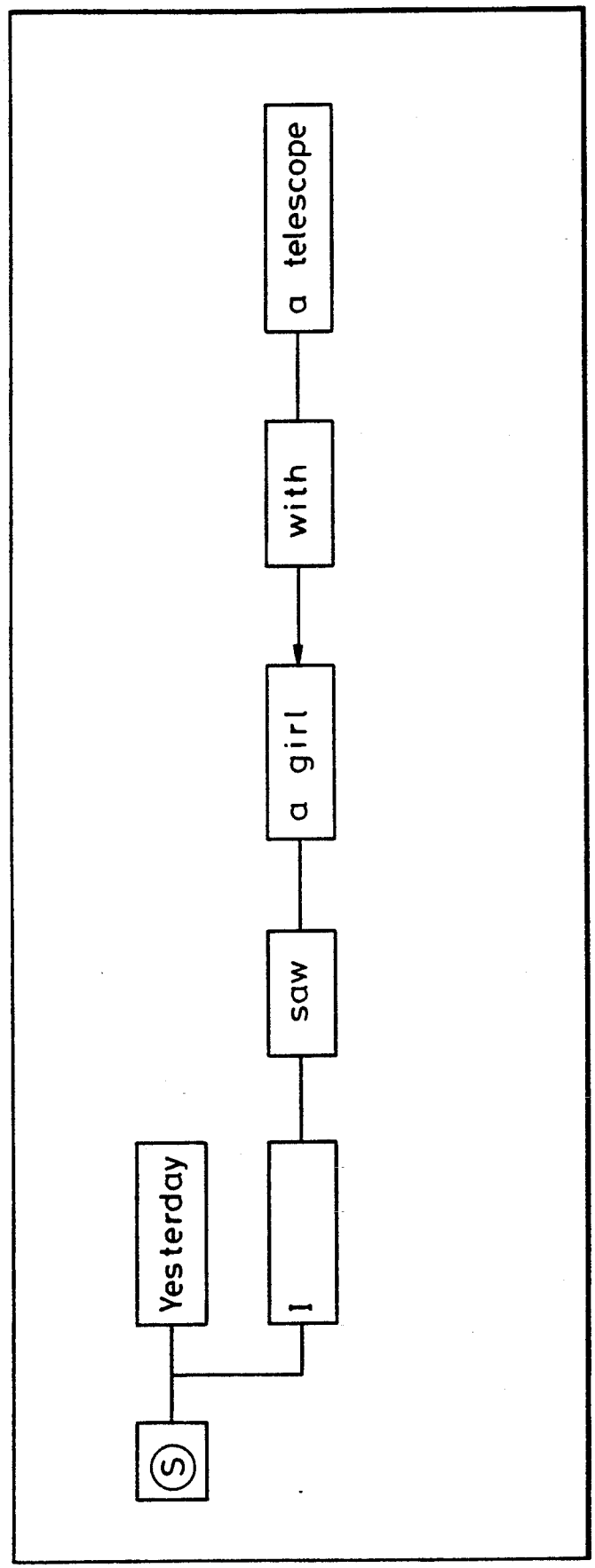

Similarly, for a case in which the bunsetsu "with" modifies "a girl" in the above-described example of the sentence, the kakariuke information and the kakariuke information converted by the calculation formulas (e) are shown in FIGS. 35($a$) and 35($b$), respectively. Furthermore, arrangement coordinates calculated from the kakariuke information shown in FIG. 35($b$) and arrangement coordinates made by rewriting these coordinates according to the calculation formulas (e) are shown in FIGS. 36($a$) and 36($b$), respectively. The sentence-structure diagram obtained from the arrangement coordinates shown in FIG. 36($b$) is shown in FIG. 37. Since the details of the above-described processing are totally identical to those for the case described before, an explanation thereof will be omitted.

Figure 34:
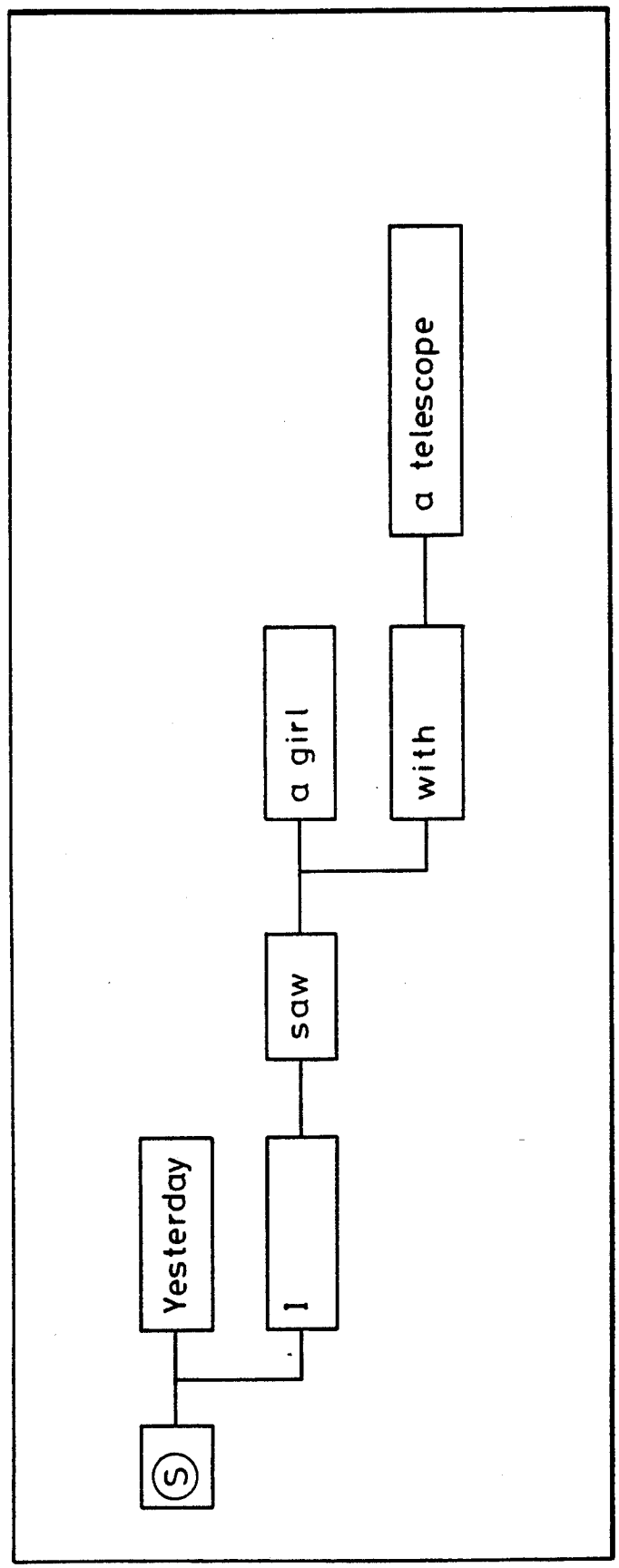
FIGS. 34 and 37 are diagrams showing examples of the sentence-structure diagram.

By simultaneously or sequentially displaying the sentence-structure diagrams shown in FIGS. 34 and 37, it is possible to notify the user of the multivocal property (vagueness) of this sentence.

Although, in the above-described embodiment, the article is made as one body together with the noun, a preposition and the like may also be dealt with as a part of a noun phrase or a prepositional phrase. To the contrary, all the words may be independently dealt with, and it may, for example, be determined that a noun to which an article is to be added modifies the article.

Furthermore, in the above-described embodiment, in order to utilize the flowchart of the sentence-structure diagram forming processing for Japanese, shown in FIG. 7, for the English sentence without alteration, the conversion operations at steps S3201 and S3203 are needed in the sentence-structure diagram forming processing procedure shown in FIG. 32. However, the above-described steps of the conversion and reconversion become unnecessary, if a flowchart for English which is equivalent to the flowchart shown in FIG. 7 is provided and utilized.

The present invention is not limited to the above embodiments and various changes and modifications can be made within the spirit and scope of the presente invention. Therefore, to apprise the public of the scope of the present invention the following claims are made.

What is claimed is:

1. A text processing apparatus comprising:
    sentence holding means for holding a sentence:
    dictionary means for storing information for analyzing the sentence:
    sentence analyzing means for analyzing the sentence held in said sentence holding means to determine modification relations between words or phrases constituting the sentence using information stored in said dictionary means;
    modification information holding means for holding information about the modification relations obtained from the result of the determination by said sentence analysis means;
    sentence-structure diagram formation means for forming a diagram showing the modification relation structure of the sentence held in said sentence holding means so that a plurality of words or phrases which modify the same word or phrase are arranged in parallel according to the modification relations held in said modification information holding means and that a distance between words or phrases in modification relation with each other in the diagram reflects the distance between them in the sentence held in said sentence holding means; and
    display means for displaying the modification relation sentence-structure diagram formed by said sentence-structure diagram formation means.

2. A text processing apparatus according to claim 1, wherein said sentence-structure diagram formation means forms the sentence-structure diagram so that the order of appearance of words and phrases in the sentence-structure diagram coincides with the order of words or phrases in the sentence held in said sentence holding means.

3. A text apparatus according to claim 1, wherein said sentence-structure diagram formation means forms the sentence-structure diagram to discriminate between different kinds of modification relations.

4. A text processing apparatus according to claim 1, further comprising first display control means for controlling to display a plurality of candidates for sentence-structure diagram simultaneously when the plurality of candidates for the sentence-structure diagram have been formed by said sentence-structure diagram formation means.

5. A text processing apparatus according to claim 1, further comprising first display control means for controlling to display a plurality of candidates for the sentence-structure diagram sequentially when the plurality of candidates for the sentence-structure diagram have been formed by said sentence-structure diagram formation means.

6. A text processing apparatus comprising:
    sentence holding means for holding a sentence:
    dictionary means for storing information for analyzing the sentence:
    sentence analyzing means for analyzing the sentence held in said sentence holding means to determine modification relations between words or phrases constituting the sentence using information stored in said dictionary means;
    modification information holding means for holding information about the modification relations obtained from the result of the determination by said sentence analyzing means;
    sentence-structure diagram formation means for forming a diagram showing the modification relation structure of the sentence held in said sentence holding means so that a plurality of words or phrases which modify the same word or phrase are arranged in parallel according to the modification relations held in said modification information holding means and that a distance between words or phrases in modification relation with each other in the diagram reflects the distance between them in the sentence held in said sentence holding means;
    display means for displaying the modification relation sentence-structure diagram formed by said sentence-structure diagram formation means;
    sentence-structure diagram correction means for altering a structure in the modification relation sentence-structure diagram displayed on said display means; and
    sentence formation means for forming a sentence in accordance with the modification relation sentence-structure diagram in which the modification relation is altered by said sentence-structure diagram correction means.

7. A text processing apparatus according to claim 6, wherein said sentence-structure diagram correction means includes assignment means for assigning a word or phrase in accordance with the modification relation to be altered in the modification relation sentence-structure diagram displayed on said display means.

8. A method for text processing by an apparatus equipped with a dictionary memory which stores information for analyzing a sentence, the method comprising steps of:
    holding a sentence in a first memory;
    analyzing the sentence held in said first memory to determine modification relations between words or phrases constituting the sentence by using information stored in said dictionary memory;
    holding information about the modification relations obtained from the result of the determination in a second memory; and
    forming a diagram showing the modification relation structure of the sentence held in said first memory so that a plurality of words or phrases which modify the same word or phrase are arranged in parallel according to the modification relations held in said second memory and that a distance between words and phrases in modification relation with each other in the diagram reflects the distance between them in the sentence held in said first memory.

9. A method for text processing according to claim 8, wherein in said step of forming the sentence-structure diagram, the sentence-structure diagram is formed so that the order of appearance of words and phrases in it coincides with the order of words or phrases in the sentence held in said first memory.

10. A method for text processing by an apparatus equipped with a dictionary memory which stores information for analyzing a sentence, the method comprising the steps of:

holding a sentence in a first memory;

analyzing the sentence held in said first memory to determine modification relations between words or phrases constituting the sentence by using information stored in said dictionary memory;

holding information about the modification relations obtained from the result of the determination in a second memory;

forming a diagram showing the modification relation structure of the sentence held in said first memory so that a plurality of words or phrases which modify the same word or phrase are arranged in parallel according to the modification relations held in said second memory and that a distance between words and phrases in modification relation with each other in the diagram reflects the distance between tham in the sentence held in said first memory;

displaying the modification relation sentence-structure diagram formed above;

altering the structure in the modification relation sentence-structure diagram displayed; and forming a sentence in accordance with the altered modification relation sentence-structure diagram in which the modification relation is altered.

* * * * *

UNITED STATES PATENT AND TRADEMARK OFFICE
CERTIFICATE OF CORRECTION

PATENT NO. : 5,170,349
DATED : December 8, 1992
INVENTOR(S) : TSUYOSHI YAGISAWA ET AL.   Page 1 of 4

It is certified that error appears in the above-identified patent and that said Letters Patent is hereby corrected as shown below:

COLUMN 1

Line 18, "an" (second occurrence) should read --a--.
Line 25, "or" should read --of--.
Line 36, "correspond" should read --corresponds--.

COLUMN 2

Line 17, "mutal" should read --mutual--.
Line 18, "a" should read --as--.
Line 20, "diagram,and" should read --diagram, and--.

COLUMN 4

Line 64, "and," should read --end,--.

COLUMN 5

Line 24, "performed" should read --performed as to--.
Line 35, "pharase" should read --phrase--.

COLUMM 6

Line 31, "number" should red --number N--.
Line 51, "$C_{82}6$," should read --$C_{82}=6$,--.
Line 62, "$_{x7}-1+3=4$." should read --$_{x7}=1+3=4$.--.

UNITED STATES PATENT AND TRADEMARK OFFICE
CERTIFICATE OF CORRECTION

PATENT NO. : 5,170,349
DATED : December 8, 1992
INVENTOR(S) : TSUYOSHI YAGISAWA ET AL.   Page 2 of 4

It is certified that error appears in the above-identified patent and that said Letters Patent is hereby corrected as shown below:

COLUMN 7

Line 39, "$y_{i+1}=\text{----}=y_m$" should read --$y_{i+1}=\text{----}Y_m$--.

COLUMN 8

Line 52, "modifcation" should read --modification--.
Line 64, "of the" (second occurrence) should be deleted.

COLUMN 9

Line 11, "will" should read --will be--.

COLUMN 11

Line 65, "composition"" should read --Composition"--.

COLUMN 12

Line 62, ""    "." should read --"追いかけた".--.

COLUMN 14

Line 17, "ther" should read --there--.

COLUMN 15

Line 41, "adn" should read --and--.
Line 55, "example" should read --example,--.

UNITED STATES PATENT AND TRADEMARK OFFICE
CERTIFICATE OF CORRECTION

PATENT NO. : 5,170,349
DATED : December 8, 1992
INVENTOR(S) : TSUYOSHI YAGISAWA ET AL.   Page 3 of 4

It is certified that error appears in the above-identified patent and that said Letters Patent is hereby corrected as shown below:

COLUMN 16

Line 47, "say" should read --saw--.

COLUMN 17

Line 3, "with" should read --which--.
Line 60, insert, --Calculation formulas (d):--.

COLUMN 18

Line 2, "according" should read --according to--.
Line 8, "a" should read --at--.
Line 63, "dealed" should read --dealt--.
Line 65, "dealed" should read --dealt--.

COLUMN 19

Line 14, "presente" should read --present--.
Line 19, "sentence:" should read --sentence;--.
Line 21, "sentence:" should read --sentence;--.
Line 30, "analysis" should read --analyzing--.
Line 53, "text apparatus" should read
        --text processing apparatus--.

COLUMN 20

Line 4, "sentence:" should read --sentence;--.
Line 6, "sentence:" should read --sentence;--.
Line 48, "steps" should read --the steps--.

UNITED STATES PATENT AND TRADEMARK OFFICE
CERTIFICATE OF CORRECTION

PATENT NO. : 5,170,349
DATED : December 8, 1992
INVENTOR(S) : TSUYOSHI YAGISAWA ET AL.  Page 4 of 4

It is certified that error appears in the above-identified patent and that said Letters Patent is hereby corrected as shown below:

COLUMN 22

Line 9, "tham" should read --them--.

Signed and Sealed this

Twenty-ninth Day of March, 1994

Attest:

BRUCE LEHMAN

Attesting Officer  Commissioner of Patents and Trademarks